United States Patent
Goh et al.

(10) Patent No.: US 10,091,383 B2
(45) Date of Patent: Oct. 2, 2018

(54) IMAGE READING APPARATUS, IMAGE FORMING APPARATUS, IMAGE READING METHOD, AND RECORDING MEDIUM

(71) Applicants: Naoki Goh, Tokyo (JP); Masaki Nagase, Kanagawa (JP); Hiroki Shirado, Kanagawa (JP); Naoki Asaba, Kanagawa (JP); Shiho Shimosaka, Tokyo (JP); Satoshi Hatanaka, Kanagawa (JP); Osamu Kizaki, Saitama (JP); Hiroshi Ishii, Tokyo (JP); Masayuki Yabuuchi, Kanagawa (JP); Hideki Hashimoto, Tokyo (JP); Atsushi Yoshida, Kanagawa (JP); Masafumi Kishi, Kanagawa (JP); Ayumu Hashimoto, Kanagawa (JP)

(72) Inventors: Naoki Goh, Tokyo (JP); Masaki Nagase, Kanagawa (JP); Hiroki Shirado, Kanagawa (JP); Naoki Asaba, Kanagawa (JP); Shiho Shimosaka, Tokyo (JP); Satoshi Hatanaka, Kanagawa (JP); Osamu Kizaki, Saitama (JP); Hiroshi Ishii, Tokyo (JP); Masayuki Yabuuchi, Kanagawa (JP); Hideki Hashimoto, Tokyo (JP); Atsushi Yoshida, Kanagawa (JP); Masafumi Kishi, Kanagawa (JP); Ayumu Hashimoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/600,156

(22) Filed: May 19, 2017

(65) Prior Publication Data
US 2018/0139345 A1   May 17, 2018

(30) Foreign Application Priority Data
Nov. 17, 2016 (JP) .................. 2016-224464

(51) Int. Cl.
*H04N 1/04* (2006.01)
*G03G 15/043* (2006.01)
(Continued)

(52) U.S. Cl.
CPC ............. *H04N 1/04* (2013.01); *G03G 15/011* (2013.01); *G03G 15/043* (2013.01); *H04N 1/00766* (2013.01)

(58) Field of Classification Search
CPC ...... G03B 15/05; G03B 17/02; G03B 21/008; G03B 21/2073; G03B 2215/056;
(Continued)

(56) References Cited

U.S. PATENT DOCUMENTS

| 4,652,913 A | * | 3/1987 | Saitoh | ............. H04N 1/484 250/226 |
| 6,427,128 B1 | * | 7/2002 | Satake | ............. G01N 21/85 209/580 |

(Continued)

FOREIGN PATENT DOCUMENTS

| JP | 11-252451 | 9/1999 |
| JP | 2003-338397 | 11/2003 |

(Continued)

*Primary Examiner* — Negussie Worku
(74) *Attorney, Agent, or Firm* — Oblon, McClelland, Maier & Neustadt, L.L.P.

(57) ABSTRACT

An image reading apparatus includes: a plurality of light sources to emit light to a target to be read from a plurality of different irradiation positions; an illumination controller to sequentially and alternately turn on or off the plurality of light sources with a blinking cycle not perceptible to the human eye; an image capturing device to photoelectrically convert, pixel by pixel, reflected light of the light emitted to the target from the plurality of light sources to capture a plurality of read images; a memory to store one or more read images of the plurality of read images being captured; and a synthesizer to synthesize preset regions of the plurality of (Continued)

read images using the one or more read images stored in the memory to generate a synthesized read image representing the target, the preset region of each of the plurality of read images having an image level change caused by reflected light that is smaller than a threshold.

17 Claims, 37 Drawing Sheets

(51) Int. Cl.
  *G03G 15/01* (2006.01)
  *H04N 1/00* (2006.01)
(58) Field of Classification Search
  CPC . G03B 33/12; G03B 7/16; G03B 7/17; G06Q 30/02; G06Q 30/0241; G09F 13/02; G09F 13/04; H04N 5/2256; H04N 5/23209; H04N 5/2354; H04N 5/7458; H04N 9/3105; H04N 9/315; H04N 9/3161
  USPC ........ 358/1.14, 1.9, 474, 475, 509; 382/232, 382/240, 299
  See application file for complete search history.

(56) References Cited

U.S. PATENT DOCUMENTS

| 6,546,144 | B1* | 4/2003 | Fukuhara | G06T 3/0012 |
| | | | | 382/232 |
| 6,563,596 | B1* | 5/2003 | Narushima | H04N 1/00002 |
| | | | | 358/1.14 |
| 6,606,171 | B1* | 8/2003 | Renk | H04N 1/00002 |
| | | | | 358/475 |
| 7,173,234 | B2* | 2/2007 | Hiromatsu | H04N 1/02865 |
| | | | | 250/208.1 |
| 2006/0001924 | A1* | 1/2006 | Tatarczyk | B41F 33/0036 |
| | | | | 358/509 |
| 2009/0103053 | A1* | 4/2009 | Ichikawa | H04N 5/7458 |
| | | | | 353/33 |
| 2013/0038754 | A1* | 2/2013 | Watarai | H04N 5/77 |
| | | | | 348/231.3 |
| 2013/0063792 | A1 | 3/2013 | Nakazawa | |
| 2014/0133779 | A1* | 5/2014 | Funabashi | G06T 11/60 |
| | | | | 382/283 |
| 2014/0184896 | A1* | 7/2014 | Imafuji | G03B 7/16 |
| | | | | 348/371 |
| 2016/0065823 | A1* | 3/2016 | Katoh | H04N 5/2353 |
| | | | | 348/366 |
| 2017/0079530 | A1* | 3/2017 | DiMaio | A61B 5/0075 |
| 2017/0195540 | A1* | 7/2017 | Sambongi | H04N 5/2352 |
| 2017/0244853 | A1* | 8/2017 | Yabuuchi | H04N 1/00827 |
| 2017/0319073 | A1* | 11/2017 | DiMaio | A61B 5/0075 |
| 2017/0353684 | A1* | 12/2017 | Wang | H04N 5/374 |

FOREIGN PATENT DOCUMENTS

| JP | 2007-106383 | 4/2007 |
| JP | 2010-074725 | 4/2010 |
| JP | 2013-062684 | 4/2013 |
| JP | 2016-032219 | 3/2016 |

* cited by examiner

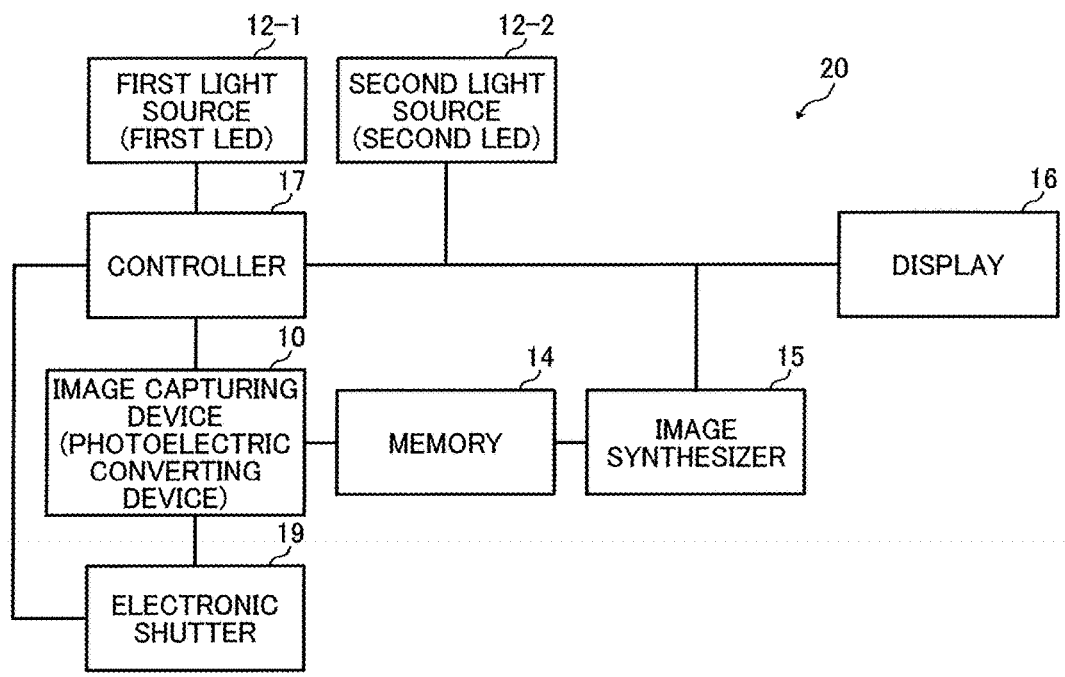
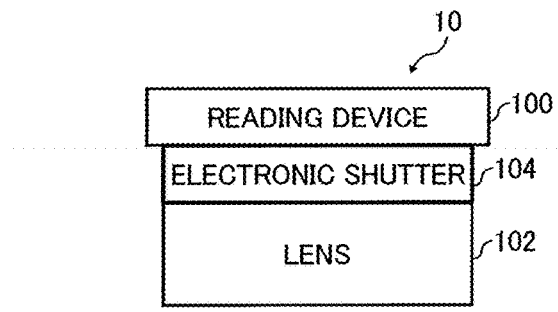
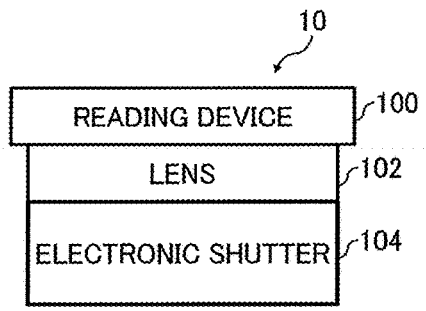

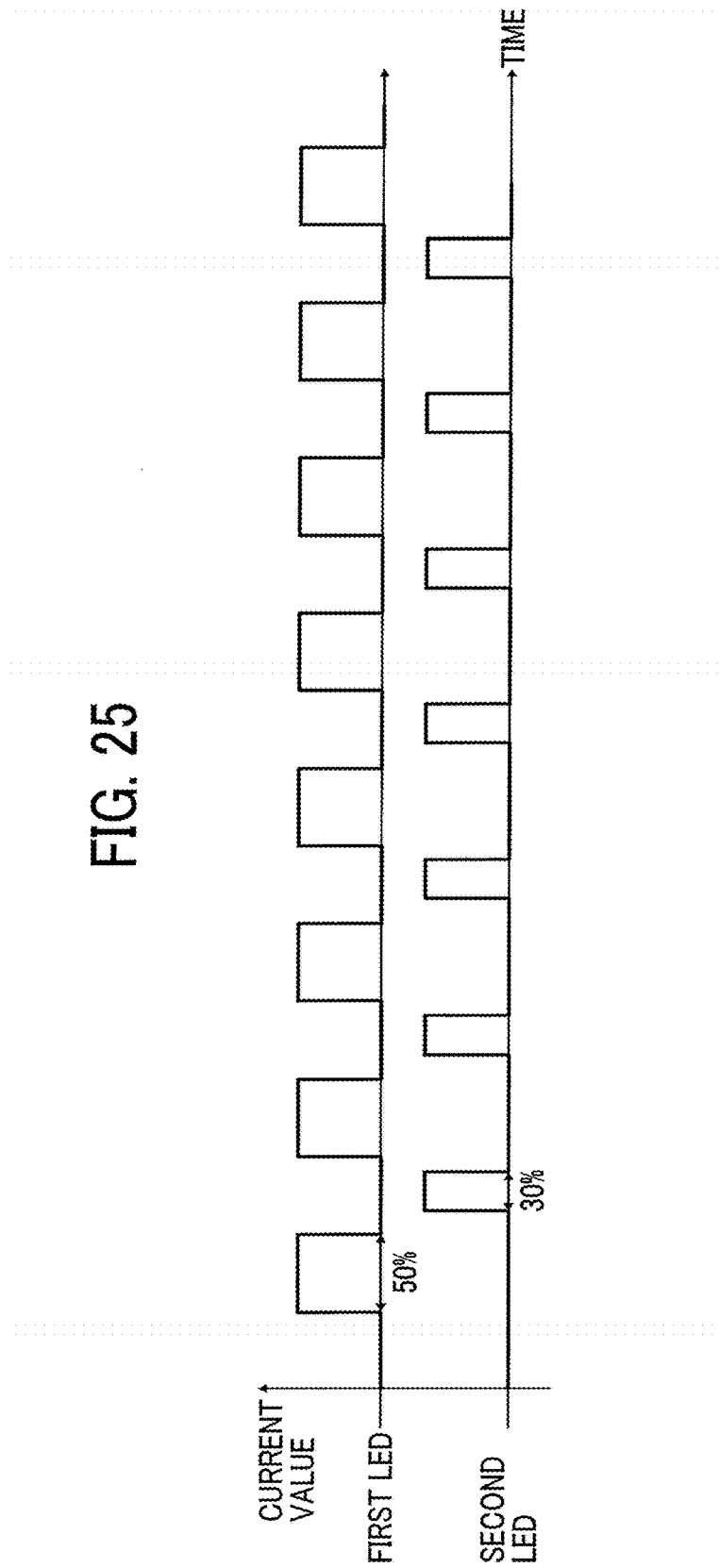

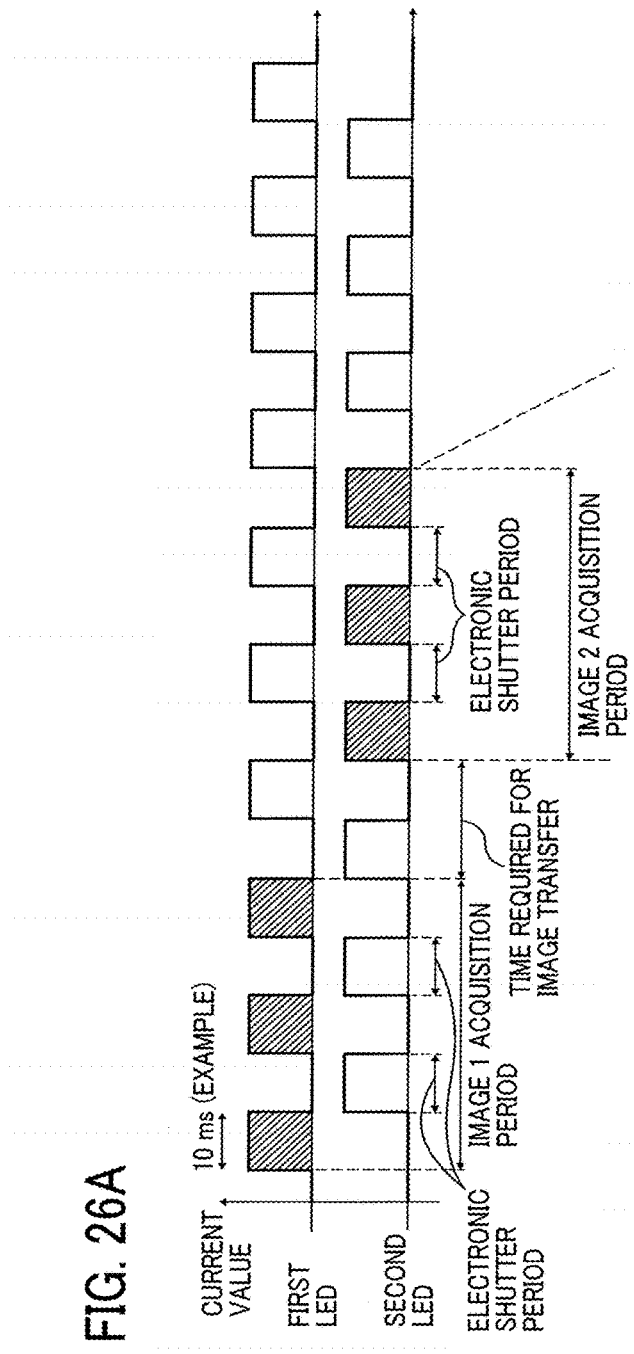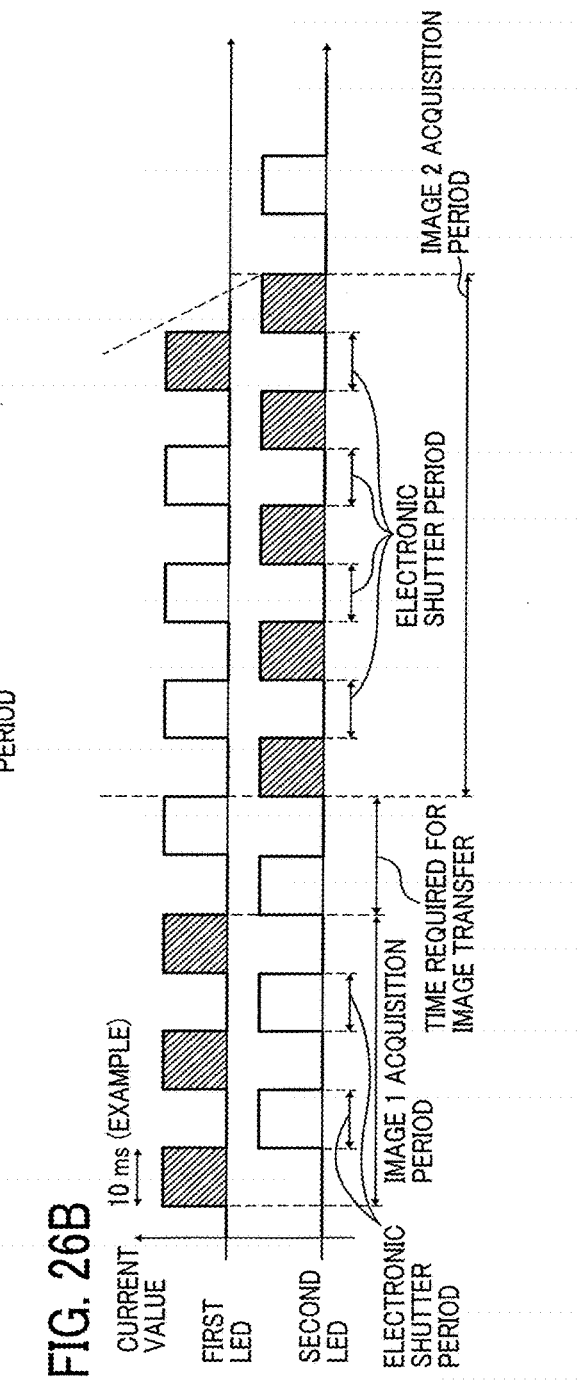

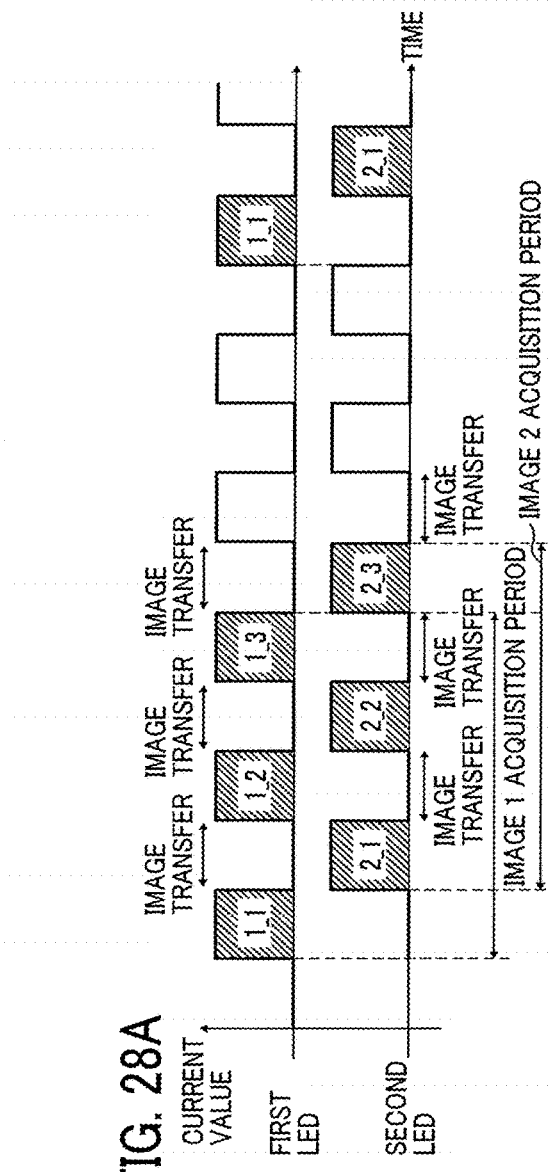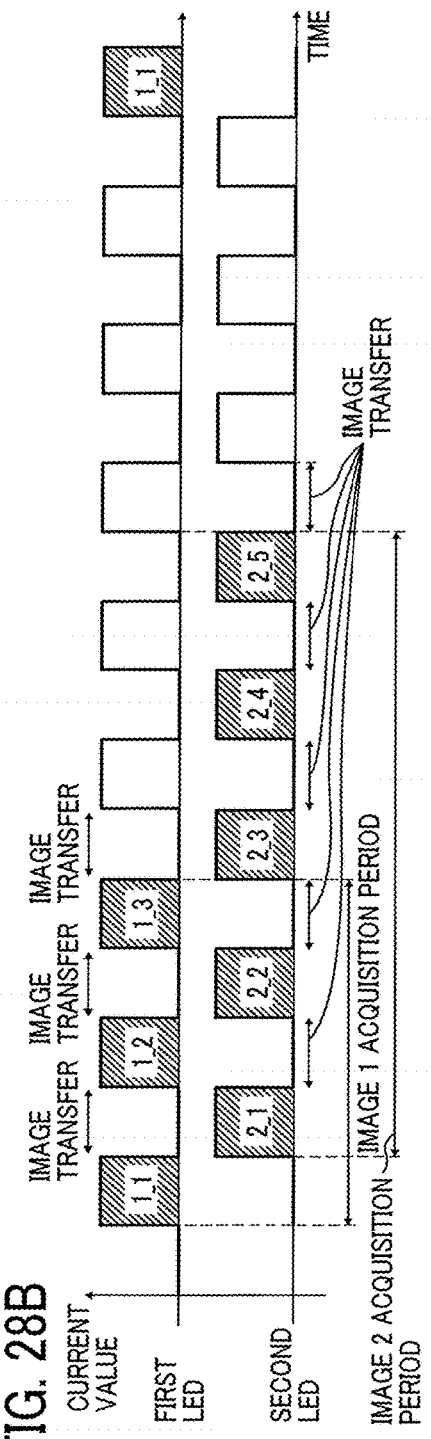

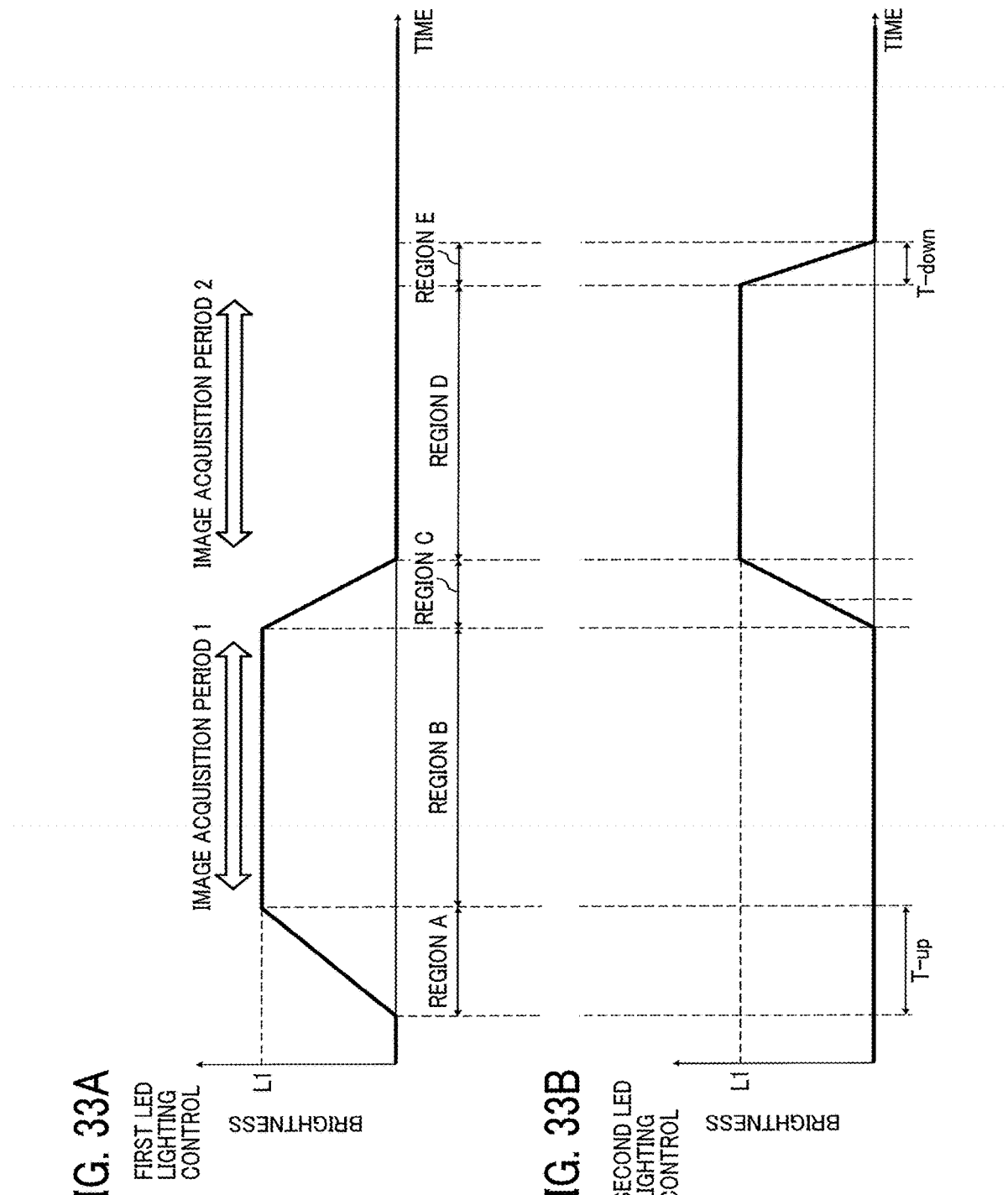

| N | LIGHTING-UP PWM VALUE |
|---|---|
| 1 | 0 |
| 2 | 5 |
| 3 | 10 |
| ... | ... |
| n | 0 |

| N | LIGHTING-UP PWM VALUE |
|---|---|
| 1 | 200 |
| 2 | 180 |
| 3 | 150 |
| ... | ... |
| n | 0 |

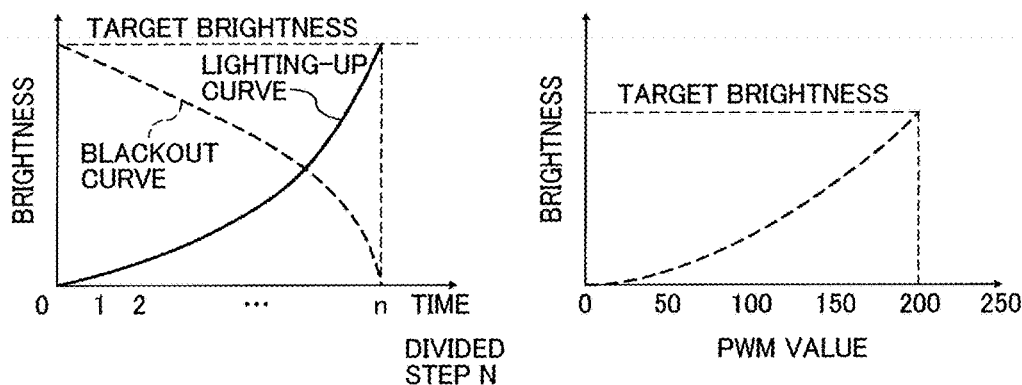

IMAGE READING APPARATUS, IMAGE FORMING APPARATUS, IMAGE READING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-224464, filed on Nov. 17, 2016, in the Japan Patent Office, the entire disclosure of which is hereby incorporated by reference herein.

BACKGROUND

Technical Field

The present invention relates to an image reading apparatus, an image forming apparatus, an image reading method, and a recording medium.

Description of the Related Art

There are various types of image reading apparatuses that read an image of an original. A known example of the image reading apparatuses is an image reading apparatus that irradiates the original, which is placed on a document table, with light from above a surface of the original to capture an image of the original.

SUMMARY

Example embodiments of the present invention include an image reading apparatus, which includes: a plurality of light sources to emit light to a target to be read from a plurality of different irradiation positions; an illumination controller to sequentially and alternately turn on or off the plurality of light sources with a blinking cycle not perceptible to the human eye; an image capturing device to photoelectrically convert, pixel by pixel, reflected light of the light emitted to the target from the plurality of light sources to capture a plurality of read images; a memory to store one or more read images of the plurality of read images being captured; and a synthesizer to synthesize preset regions of the plurality of read images using the one or more read images stored in the memory to generate a synthesized read image representing the target, the preset region of each of the plurality of read images having an image level change caused by reflected light that is smaller than a threshold.

Example embodiments of the present invention include an image forming apparatus including the image reading apparatus.

Example embodiments of the present invention include an image reading method performed by the image reading apparatus, and a non-transitory recording medium storing a control program for controlling the image reading apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is a block diagram illustrating an overview of arrangement of an image reading apparatus according to a second embodiment;

FIGS. 11A and 11B are an illustration of arrangement examples of an image capturing device;

FIG. 25 is an illustration of an example in which the illumination controller changes a pulse width;

FIGS. 26A and 26B are an illustration of an example in which the illumination controller extends an acquisition period of an image;

FIGS. 28A and 28B are an illustration of an example in which the illumination controller adjusts the number of exposed images to be acquired;

FIGS. 33A and 33B are an illustration of a lighting control example of the first LED and the second LED;

FIGS. 35A to 35C are an illustration of an example of a constant brightness PWM value table;

Figure 1A:
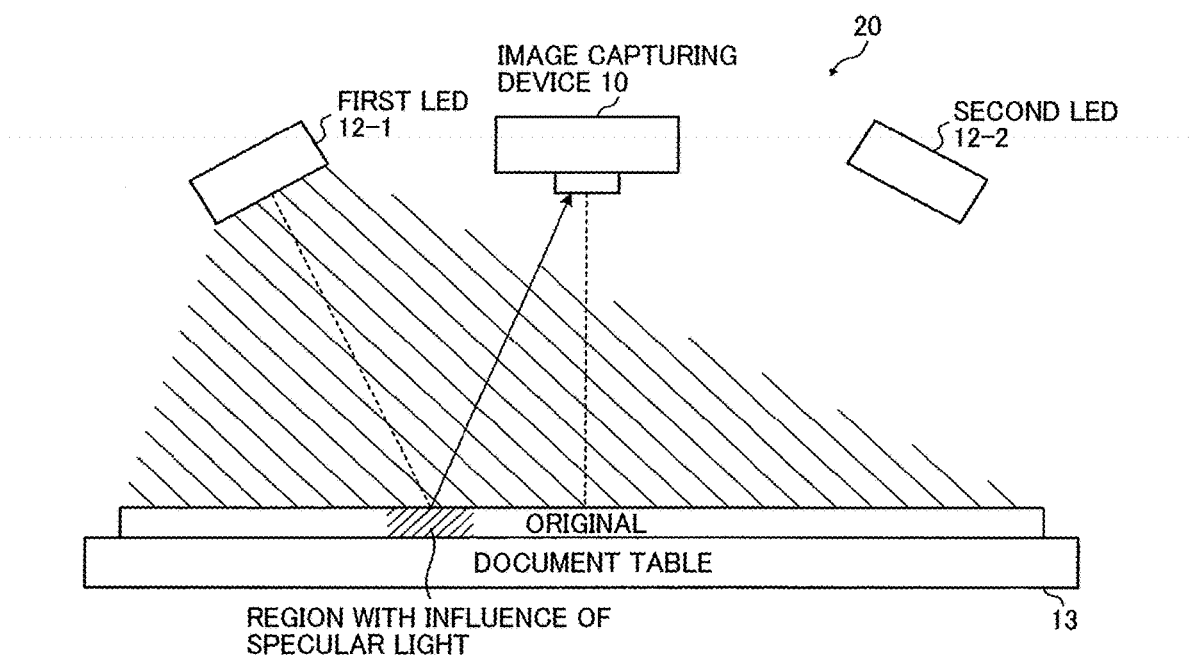
FIGS. 1A and 1B are a front view illustrating an overview of an optical system of an image reading apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 1B:
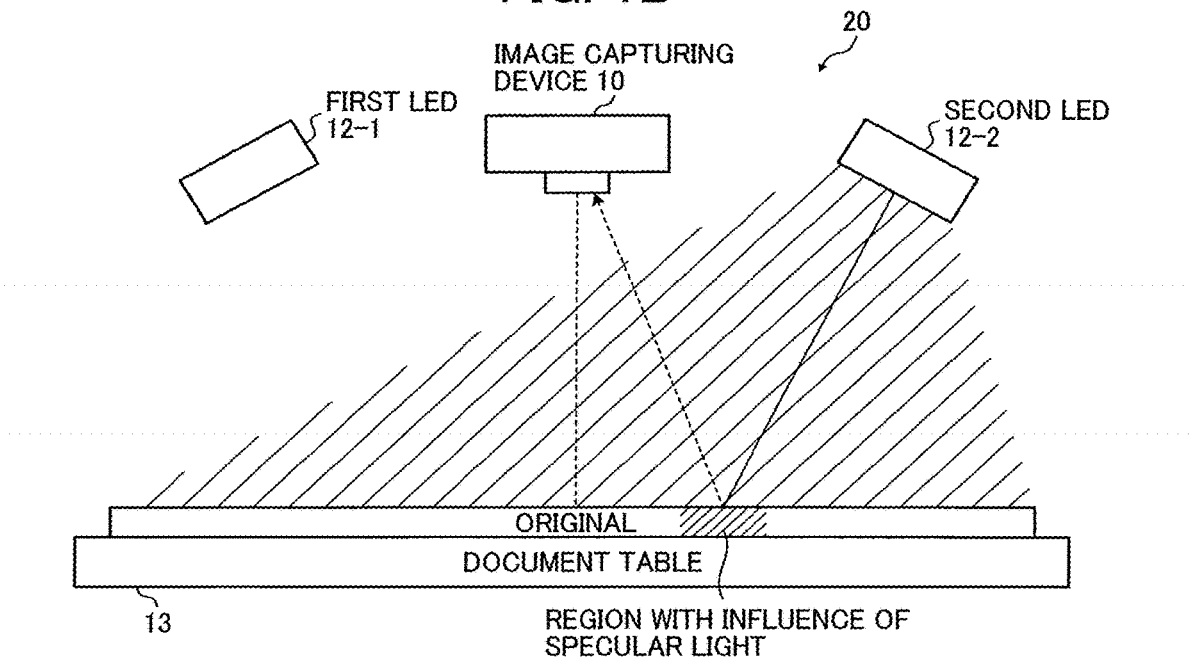

FIGS. 1A and 1B are a front view illustrating an overview of an optical system of an image reading apparatus 20. The image reading apparatus 20 includes an image capturing device 10, a first LED (first light source) 12-1, a second LED (second light source) 12-2, and a document table 13. FIG. 1A illustrates a state in which the first LED 12-1 emits light, and FIG. 1B illustrates a state in which the second LED 12-2 emits light.

The image capturing device 10 includes a lens 102 (refer to FIGS. 11A and 11B), and an area sensor (reading device) 100 (refer to FIGS. 11A and 11B) to receive reflected light to capture an image on a two-dimensional surface. The image capturing device 10 is disposed above the document table 13. The image capturing device 10 captures an image of an original (read target) on the document table 13 and outputs a read image pixel by pixel. The first LED 12-1 and the second LED 12-2 irradiate the original on the document table 13 such that the respective lights are irradiated from right and left sides of the image capturing device 10, for example. The document table 13 does not have to be provided, as long as the original is properly read.

The image capturing device 10, the first LED 12-1, and the second LED 12-2 are secured at preset positions with respect to the document table 13 by support such as a supporting frame. The image capturing device 10 may include a linear sensor that scans and captures an image on a two-dimensional surface. The image capturing device 10 may move along a surface of the document table 13 to capture an image of the original.

As described above, the original is irradiated with light with use of the first LED 12-1 and the second LED 12-2 in the image reading apparatus 20. This reduces an influence of ambient light caused by an indoor fluorescent, shadow, and the like generated in an installing environment of the capturing optical system. The number of light sources included in the image reading apparatus 20 is not limited to two, that is, the first LED 12-1 and the second LED 12-2. A plurality of light sources may be provided, which irradiate the original with light from a plurality of different positions.

Light from the first LED 12-1 and the second LED 12-2 is respectively emitted to predetermined ranges on the original as illustrated in FIGS. 1A and 1B. However, depending on the material and the gloss level of the original, light from the first LED 12-1 and the second LED 12-2 is not completely diffusely-reflected on the original surface, such that specular light is incident into the image capturing device 10.

As a result, in each region influenced by the specular light illustrated in FIGS. 1A and 1B, the image level will increase when the image capturing device 10 captures an image, and an image level change and saturation such as overexposure will occur, which will cause characters in the original to be unrecognizable. For example, emission of light from the first LED 12-1 causes specular light to be generated in a specific region on the left side of the original (shaded region) in FIG. 1A. Similarly, as illustrated in FIG. 1B, emission of light from the second LED 12-2 causes specular light on the opposite side.

Under such circumstances, in the image reading apparatus 20, to acquire a read image with no influence of specular light, the first LED 12-1 and the second LED 12-2 sequentially light up to acquire image data of a plurality of pages, each image data being captured at each time of lighting-up. In generating the image data of the plurality of pages being captured, the image reading apparatus 20 synthesizes image data of regions with no influence of specular light, without using regions of image data with an influence of specular light.

Figure 2:
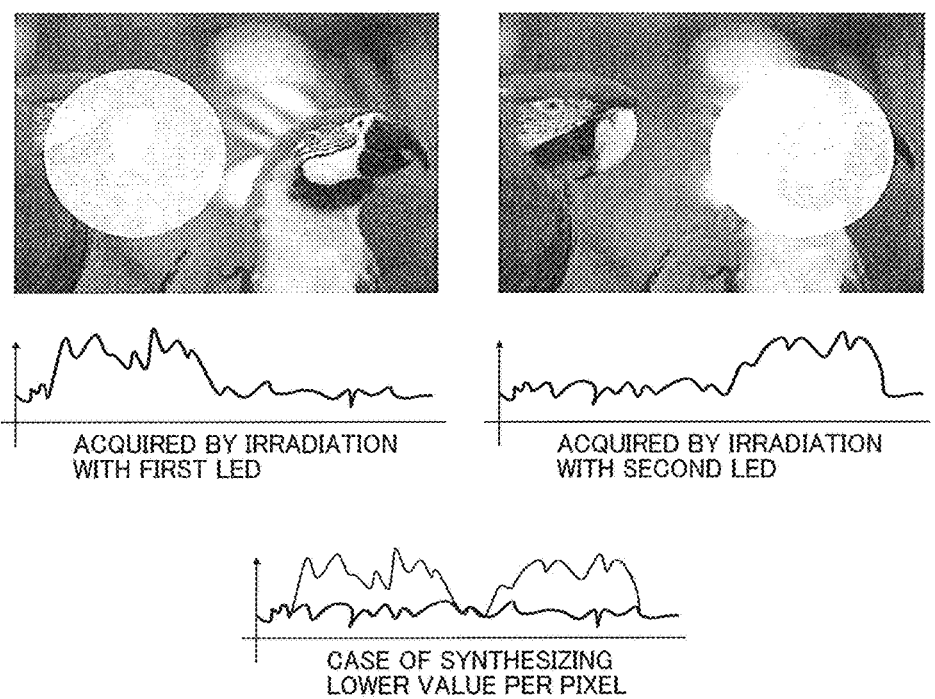
FIG. 2 is an illustration for explaining example operation of synthesizing images to eliminate influence by specular light.

FIG. 2 is an illustration for explaining example operation of synthesizing images while eliminating influence by specular light. As illustrated in FIG. 2, a value of a luminance component of a pixel in a region irradiated with specular light is higher than a value of a luminance component of a pixel in the other region. Two images acquired when the first LED 12-1 and the second LED 12-2 respectively emit light are compared, and image synthesis is performed with use of a pixel having a lower luminance component value in each pair of corresponding pixels, to generate an image with no influence of specular light.

Figure 3A:
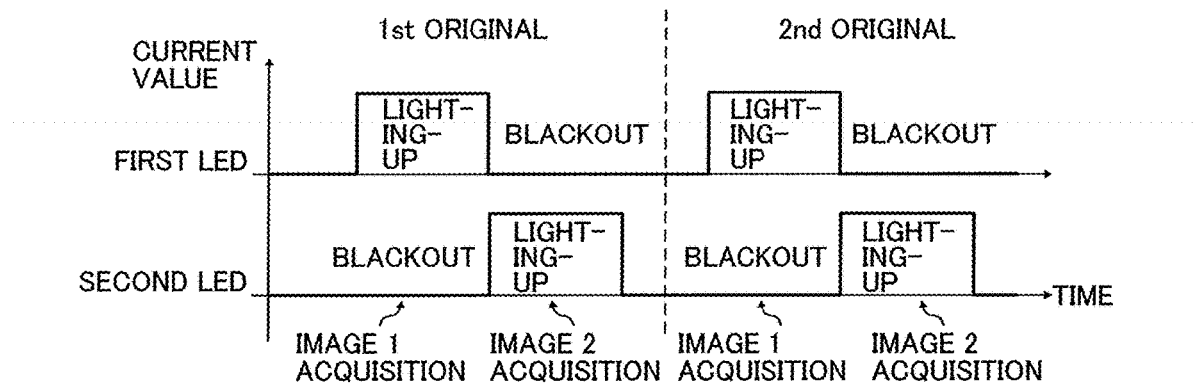
FIGS. 3A and 3B are an illustration for explaining lighting-up time of light sources according to a comparative example.
Figure 3B:
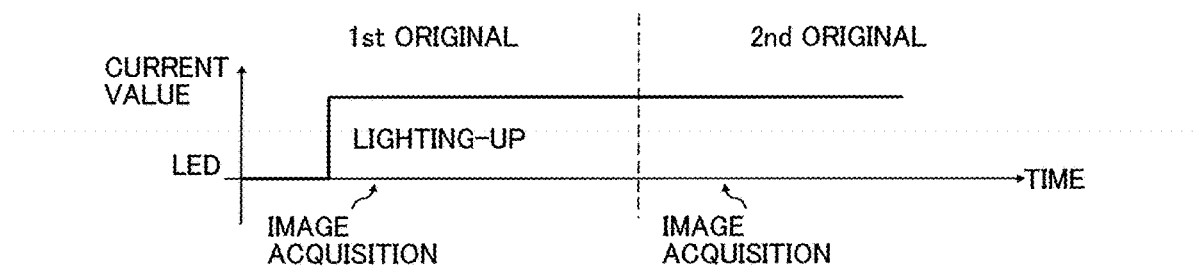

FIGS. 3A and 3B illustrate an example of lighting-up time of light sources (LEDs) according to a comparative example. FIG. 3A illustrates a case in which the first LED 12-1 and the second LED 12-2 alternately light up and black out while FIG. 3B illustrates a case in which an LED keeps lighting up. As illustrated in FIG. 3A, when each of images irradiated from the right and left sides is captured, the first LED 12-1 and the second LED 12-2 alternately light up and black out. This causes flicker and makes a user feel uncomfortable. In particular, in a case in which there are a plurality of pages of original, the influence of this flicker would be remarkable. On the other hand, as illustrated in FIG. 3B, when the LED keeps lighting up to attempt to prevent the flicker, overexposure would not be prevented.

Next, the image reading apparatus 20 according to a first embodiment will be described.

Figure 4:
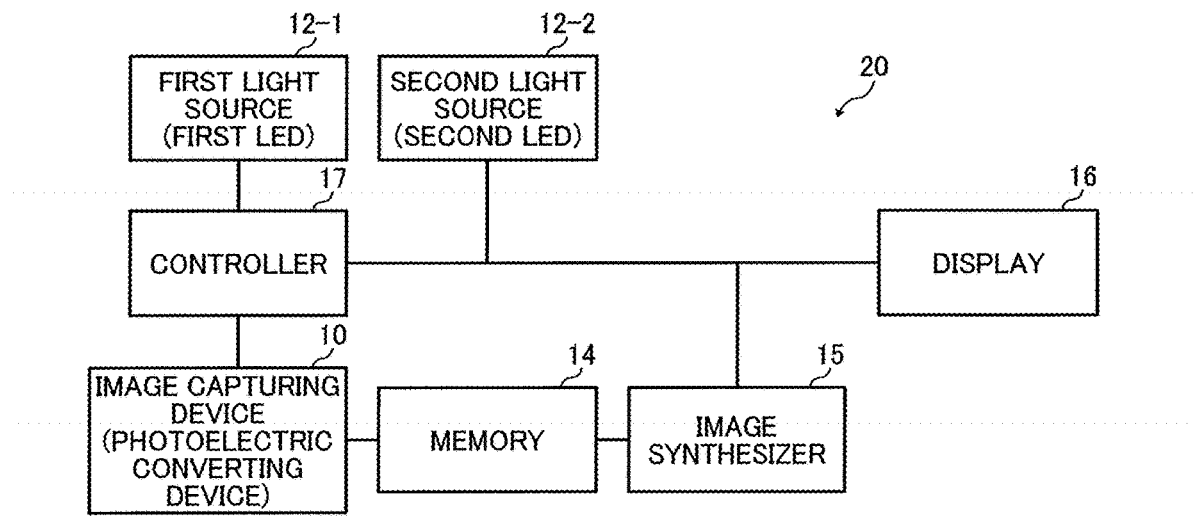
FIG. 4 is a block diagram illustrating an overview of arrangement of an image reading apparatus according to a first embodiment.

FIG. 4 is a block diagram illustrating an overview of arrangement of the image reading apparatus 20 according to the first embodiment. In the following description, components of the image reading device 20 that are substantially similar to those in the image reading apparatus 20 illustrated in FIG. 4 are provided with the same reference numerals.

As illustrated in FIG. 4, the image reading apparatus 20 includes the image capturing device (photoelectric converting device) 10, the first light source (first LED) 12-1, the second light source (second LED) 12-2, a memory 14, an image synthesizer 15, a display 16, and a controller 17. The image reading apparatus 20 aims to prevent flicker caused by lighting-up and blackout of the first LED 12-1 and the second LED 12-2 from making a user feel uncomfortable.

In the image reading apparatus 20, an installing position, an irradiation angle, and light level of each of the first LED 12-1 and the second LED 12-2, serving as optical conditions, are preset so that light level required for a specular region generated by one light source (for example, the first LED 12-1) may be emitted by the other light source (for example, the second LED 12-2) (refer to FIG. 1). Similarly, the optical conditions of the first LED 12-1 and the second LED 12-2 are preset so that light level required for a specular region generated by the other light source (for example, the second LED 12-2) may be emitted by one light source (for example, the first LED 12-1). That is, the first LED 12-1 and the second LED 12-2 can emit light from mutually different irradiation positions preset with respect to the read target.

The controller 17 includes a CPU or the like to control the respective components included in the image reading apparatus 20. The controller 17 controls the first LED 12-1 and the second LED 12-2 to sequentially, alternately light up and black out with a blinking cycle that is not perceptive to the human eye. The level of light emitted by the first LED 12-1 and the second LED 12-2 is much higher than the light level used in a general flicker test. The controller 17 causes the first LED 12-1 and the second LED 12-2 to light up and black out with a shorter cycle (for example, 10 ms or less) than the cycle in blinking of a light source in the flicker test (for example, 35 Hz).

The image capturing device 10 photoelectrically converts per pixel reflected light of light sequentially alternately emitted to the read target by the first LED 12-1 and the second LED 12-2 to capture a plurality of read images. When at least either the first LED 12-1 or the second LED 12-2 emits light to the read target, the memory 14 stores a result captured by the image capturing device 10 as one or more read images.

The image synthesizer 15 uses one or more read images stored in the memory 14 to synthesize setting regions, in the plurality of respective read images captured by the image capturing device 10 when the first LED 12-1 and the second LED 12-2 sequentially alternately emit light to the read target, in which an image level change caused by specular light is small (smaller than a threshold). In this manner, the image synthesizer 15 synthesizes a read image corresponding to a read target. That is, since, in the image reading apparatus 20, the cycle of lighting-up and blackout of the first LED 12-1 and the second LED 12-2 is a blinking cycle that is not perceptible to the human eye, the flicker caused by lighting-up and blackout of the first LED 12-1 and the second LED 12-2 does not make the user feel uncomfortable. The image synthesizer 15 is implemented as a CPU or a circuit.

The display 16 includes a touch panel, for example, and displays information relating to the image reading apparatus 20 to the user.

Next, various functions executed by the controller 17 will be described.

Figure 5:
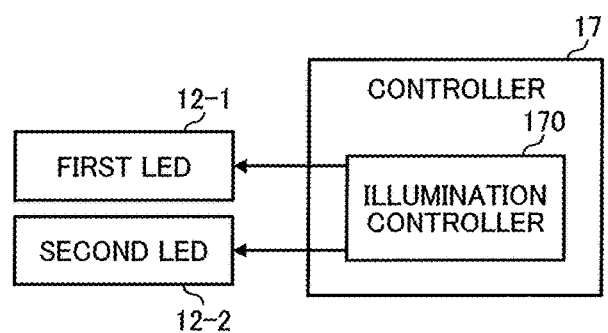
FIG. 5 is a functional block diagram illustrating functions of a controller of the image reading apparatus illustrated in FIG. 4, according to the first embodiment.

FIG. 5 is a functional block diagram illustrating functions executed by the controller 17 of the image reading apparatus 20 according to the first embodiment. As illustrated in FIG. 5, the controller 17 includes an illumination controller 170. The illumination controller 170 controls the first LED 12-1 and the second LED 12-2 to sequentially alternately light up and black out with a blinking cycle that is not perceptible to the human eye.

Figure 6:
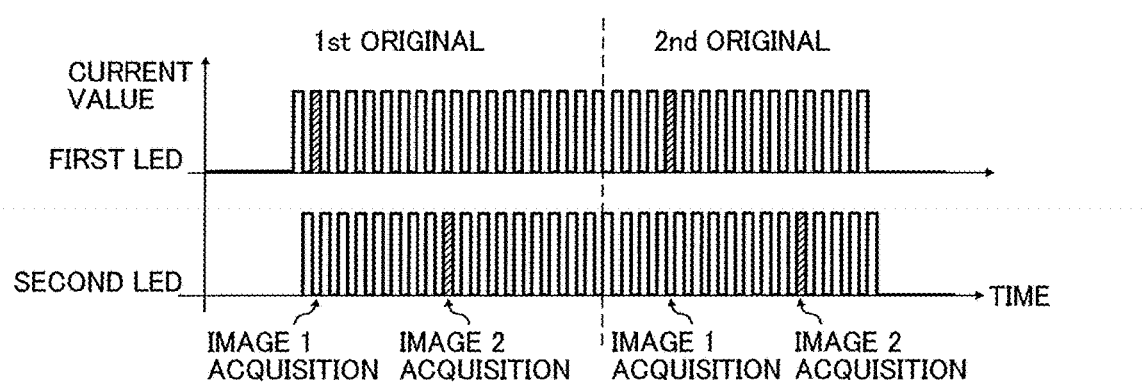
FIG. 6 is an illustration of an example lighting-up operation of light sources in the image reading apparatus.

FIG. 6 is an illustration for explaining an example lighting-up operation performed by the light sources (LEDs) in the image reading apparatus 20. The controller 17 (illumination controller 170) of the image reading apparatus 20 pulse-controls the first LED 12-1 and the second LED 12-2. In the pulse control for the first LED 12-1 and the second LED 12-2, pulse timing is shifted so that ON periods of the LEDs may not overlap with each other. In another example, the illumination controller 170 may perform PWM control to control lighting-up and blackout of the first LED 12-1 and the second LED 12-2. Hereinafter, a case in which the illumination controller 170 controls the first LED 12-1 and the second LED 12-2 by the PWM control (pulse control mainly with a constant pulse width) will be described as an example. Alternatively, the illumination controller 170 may control the first LED 12-1 and the second LED 12-2 by pulse width modulation.

The image reading apparatus 20 acquires images irradiated from the right and left sides (image 1 and image 2) in the respective ON periods (shaded parts in FIG. 6), and the image synthesizer 15 synthesizes respective images in regions with no influence of specular light, to generate a read image of one page. Since the pulse cycle is sufficiently short, the flicker caused by ON/OFF of the first LED 12-1 and the second LED 12-2 is not recognized by the user and looks as if the LEDs kept lighting up. In the example illustrated in FIG. 6, an interval is provided after acquisition of image 1 and before acquisition of image 2 to secure sufficient transfer time. However, in a case in which the transfer time is sufficiently short, image 2 may be acquired immediately after acquisition of image 1.

The function of the illumination controller 170 of the controller 17 may be implemented by a CPU (Central Processing Unit), which executes software (program), or by an IC (Integrated Circuit), for example.

In a case in which the function of the illumination controller 170 of the controller 17 is partially or entirely implemented by software (program), the image reading apparatus 20 according to the present embodiment has a hardware configuration of a general-purpose computer. More specifically, in one example, the image reading apparatus 20 includes a controller such as a CPU, a memory such as a ROM (Read Only Memory) and a RAM (Random Access Memory), an external memory such as an HDD (Hard Disk Drive) and a medium drive device, a display such as a display device, and an input device such as a keyboard and a mouse.

A program executed by the image reading apparatus 20 according to the present embodiment is recorded in a computer-readable recording medium such as a CD-ROM, a flexible disk (FD), a CD-R, and a DVD (Digital Versatile Disk) as a file of an installable type or of an executable type and is provided.

The program executed by the image reading apparatus 20 according to the present embodiment may also be stored on a computer connected to a network such as the Internet so as to be downloaded and provided via the network. The program executed by the image reading apparatus 20 according to the present embodiment may further be provided or distributed via a network such as the Internet.

The program executed by the image reading apparatus 20 according to the present embodiment may still further be installed in a ROM or the like in advance and be provided.

The program executed by the image reading apparatus 20 according to the present embodiment has a modular configuration including the illumination controller 170. As hardware, a CPU (processor) reads out and executes the program from the recording medium to cause the respective components to be loaded on a main memory and to cause the illumination controller 170 to be generated on the main memory.

Next, image reading processing in the image reading apparatus 20 will be described.

Figure 7:
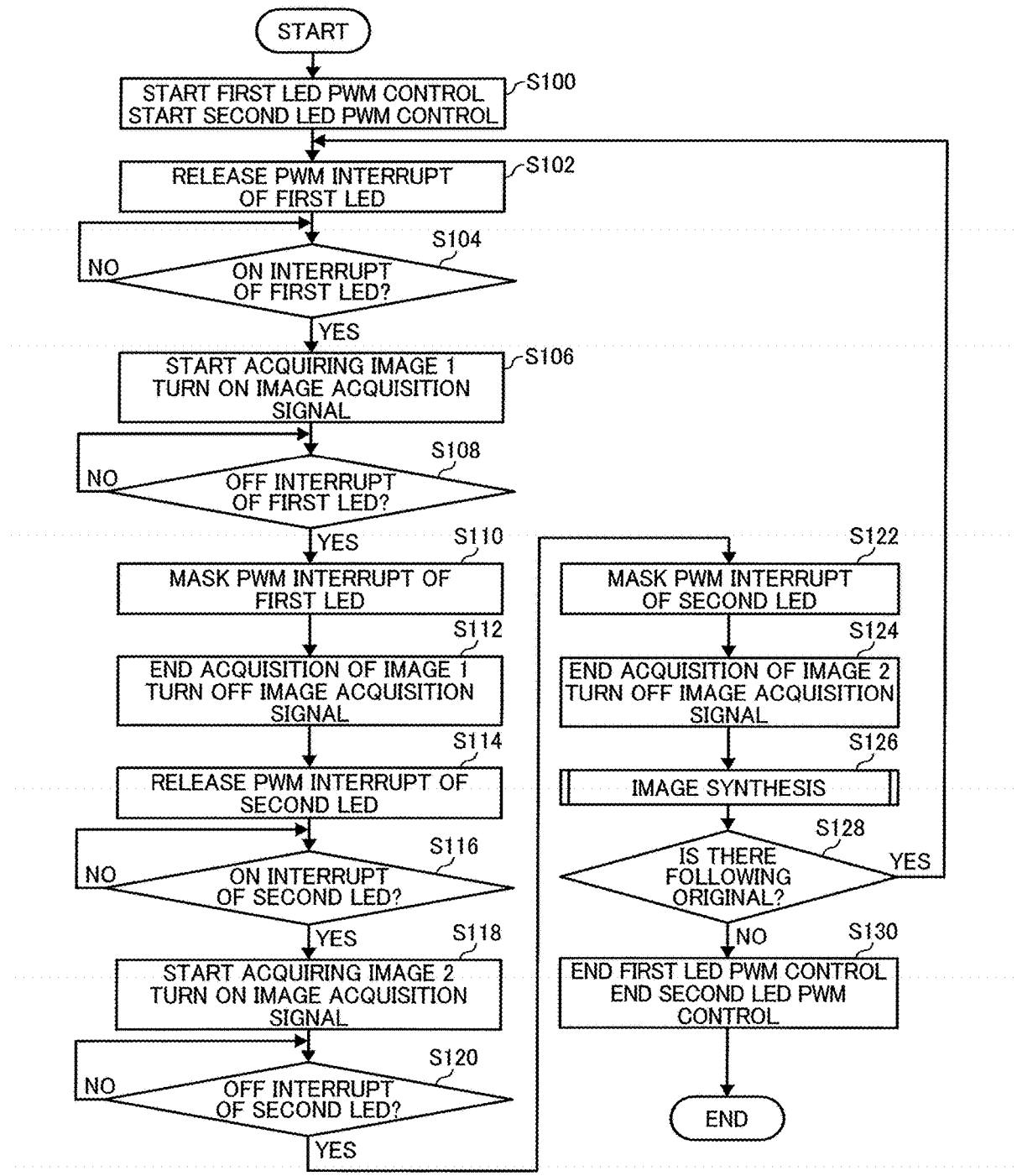
FIG. 7 is a flowchart illustrating a control example in the image reading apparatus.

FIG. 7 is a flowchart illustrating a control example in the image reading apparatus 20. The image reading apparatus 20 acquires an image in sync with ON/OFF timing of the first LED 12-1 and the second LED 12-2. Thus, the illumination controller 170 detects the ON/OFF timing of the first LED 12-1 and the second LED 12-2 as a software interrupt and takes control so that the image capturing device 10 can acquire an image in sync with this software interrupt. First, the illumination controller 170 starts PWM control (pulse control) for the first LED 12-1 and the second LED 12-2 before the image reading apparatus 20 starts image reading (S100).

In an initial state, any interrupt is in a masked state. The illumination controller 170 releases the PWM interrupt of the first LED 12-1 (S102), and an ON interrupt is triggered by ON timing. At S104, the illumination controller 170 determines whether or not the ON interrupt of the first LED 12-1 is detected. When the ON interrupt is detected ("YES" at S104), the illumination controller 170 proceeds to S106.

The illumination controller 170 starts acquiring image 1 (S106). This causes an image acquisition signal be generated. At S108, the illumination controller 170 determines whether or not an OFF interrupt is detected, and proceeds to S110 when the OFF interrupt is detected ("YES" at S108). The illumination controller 170 then masks the PWM interrupt of the first LED 12-1 (S110) to end acquisition of image 1 (S112).

The illumination controller 170 releases the PWM interrupt of the second LED 12-2 (S114), and an ON interrupt is triggered by ON timing. At S116, the illumination controller 170 determines whether or not the ON interrupt of the second LED 12-2 is detected. When the ON interrupt is detected ("YES" at S116), the illumination controller 170 proceeds to S118.

The illumination controller 170 starts acquiring image 2 (S118). This causes an image acquisition signal be generated. At S120, the illumination controller 170 determines whether or not an OFF interrupt is detected, and proceeds to step S122 when the OFF interrupt is detected ("YES" at S120). The illumination controller 170 then masks the PWM interrupt of the second LED 12-2 (S122) to end acquisition of image 2 (S124).

Subsequently, in accordance with the control of the illumination controller 170, the image synthesizer 15 compares pixel values of the acquired image 1 and image 2 and synthesizes a read image with no influence of specular light in accordance with the operation illustrated in FIG. 8 (S126).

Figure 8:
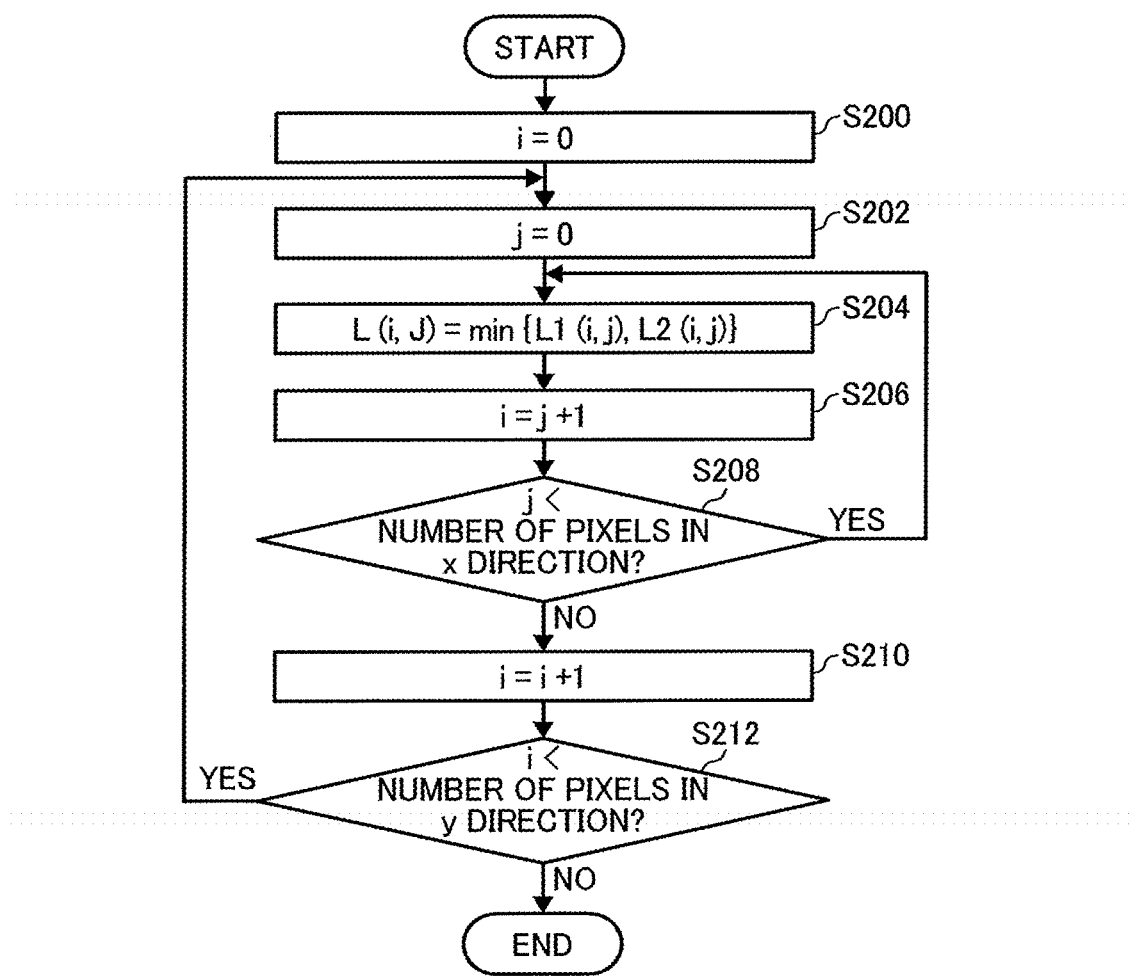
FIG. 8 is a flowchart illustrating processing performed by an image synthesizer.

Referring to FIG. 8, the pixel level of image 1 is represented as L1 (i, j) and the pixel level of image 2 as L2 (i, j). In these expressions, (i, j) represents x and y coordinates of each pixel. The image synthesizer 15 makes a comparison for all pixels in an x direction and a y direction in order from an origin (0, 0) at S200 to S212 and selects a pixel having a lower pixel level from each pixel pair to acquire a processed image L (i, j). In a case in which the number of light sources is N, the number of pixels in each comparison operation is also N.

Referring back to FIG. 7, at S128, when there is a following original ("YES" at S128), the controller 17 returns to S102 to repeat image acquisition and synthesis. In contrary, when there is no following original ("NO" at S128), the controller 17 proceeds to S130. The controller 17 ends the PWM control (pulse control) for the first LED 12-1 and the second LED 12-2 (S130). In a case in which the number of light sources is three or more, lighting-up and blackout of the respective light sources are sequentially repeated.

Figure 9:
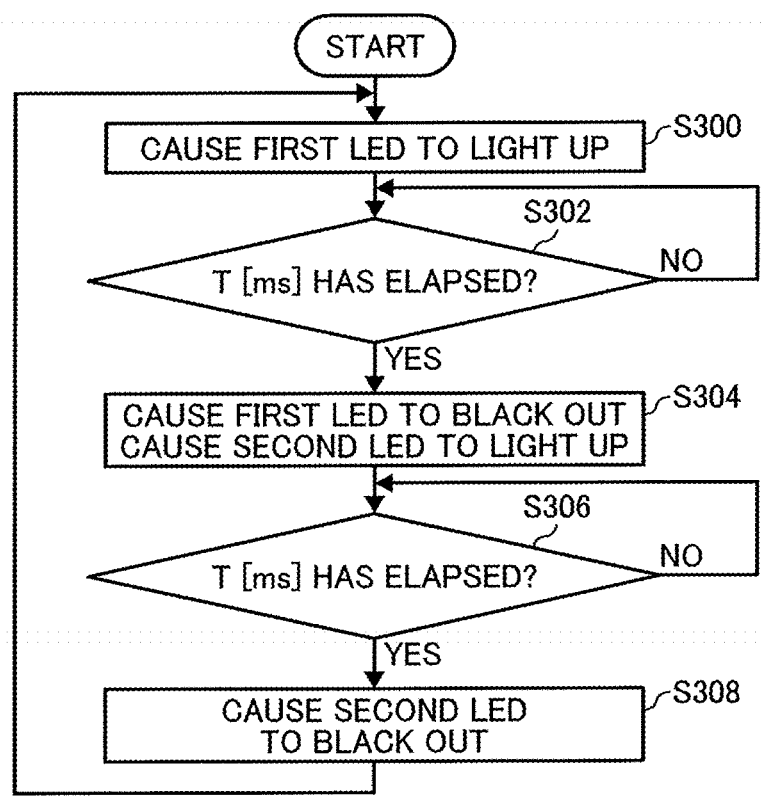
FIG. 9 is a flowchart illustrating pulse width modulation (PWM) control performed by an illumination controller, according to an embodiment.

FIG. 9 is a flowchart illustrating the PWM control (pulse control) performed by the illumination controller 170, according to an embodiment. The illumination controller 170 causes the first LED 12-1 to light up (S300) and proceeds to S304 after detecting a lapse of time T (ms) ("YES" at S302). The illumination controller 170 causes the first LED 12-1 to black out and causes the second LED 12-2 to light up (S304). On detecting a lapse of the time T (ms), the illumination controller 170 proceeds to S308 ("YES" at S306). The illumination controller 170 causes the second LED 12-2 to black out (S308) and returns to S300.

In this manner, according to the present embodiment, the image reading apparatus 20 does not perform lighting-up or blackout of each light source per image acquisition, turns on the respective light sources simultaneously by means of pulse driving (constant/variable) to avoid overlap of the ON periods, acquires images in the ON periods of the respective light sources to synthesize the images, and turns off the respective light sources simultaneously after acquiring all images. This suppresses the flicker caused by lighting-up and blackout of the light sources.

Next, a second embodiment will be described. Note that similar components to the components in the above first embodiment are assigned with the same reference numerals, and description of same components is omitted.

The first embodiment assumes that each of the images irradiated from the right and left sides can be acquired in a one-time ON period of each light source. However, in the present embodiment, each image is acquired after charge is sufficiently accumulated through several-time ON periods.

FIG. 10 is a block diagram illustrating an overview of arrangement of the image reading apparatus 20 according to the second embodiment. As illustrated in FIG. 10, the image reading apparatus 20 includes the image capturing device (photoelectric converting device) 10, the first light source (first LED) 12-1, the second light source (second LED) 12-2, the memory 14, the image synthesizer 15, the display 16, the controller 17, and an electronic shutter 19. The image reading apparatus 20 aims to prevent the flicker caused by lighting-up and blackout of the first LED 12-1 and the second LED 12-2 from making the user feel uncomfortable. Note that substantially similar components in the image reading apparatus 20 illustrated in FIG. 10 to the components described above are provided with the same reference numerals.

The electronic shutter 19 is a liquid crystal shutter, for example, and sequentially shields and exposes the image capturing device 10 from and to light in accordance with control of the illumination controller 170. FIGS. 11A and 11B illustrate arrangement examples of the image capturing device 10. The image capturing device 10 includes the reading device 100 configured to read an image such as a CMOS area sensor, the lens 102, and an electronic shutter 104 (electronic shutter 19) located as illustrated in FIGS. 11A and 11B. The illumination controller 170 takes control so that, in a case in which one of the first LED 12-1 and the second LED 12-2 emits light to the read target, the electronic shutter 19 may shield the image capturing device 10 from reflected light of light emitted to the read target by the other light source until the image capturing device 10 outputs a read image.

Figure 12:
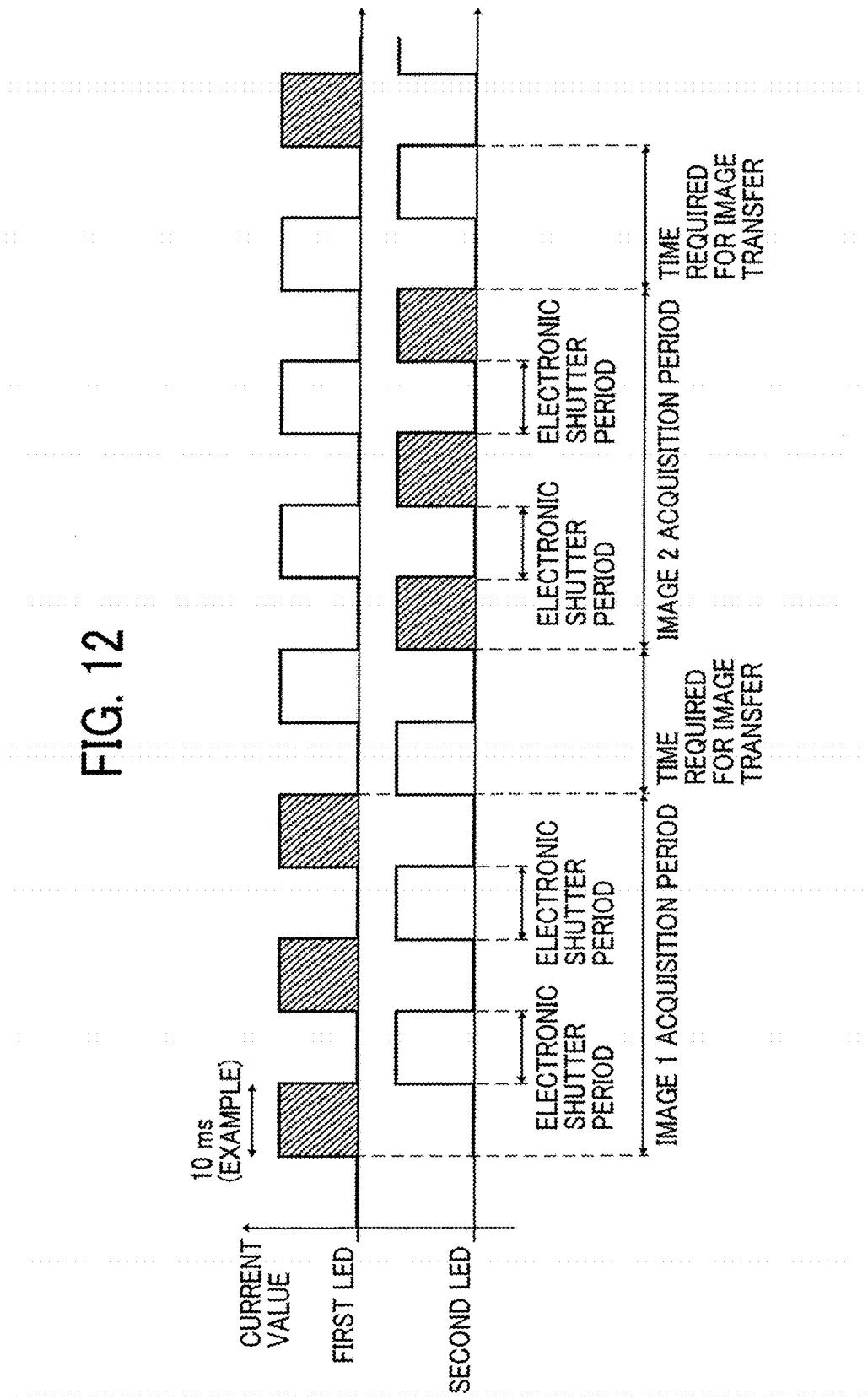
FIG. 12 is an illustration of a relationship among an image acquisition period of the image reading apparatus and lighting-up periods of a first light-emitting diode (LED) and a second LED.

FIG. 12 illustrates a relationship among an image acquisition period of the image reading apparatus 20 and lighting-up periods of the first LED 12-1 and the second LED 12-2. The image reading apparatus 20 according to the first embodiment assumes that each of the images irradiated from the right and left sides can be acquired in a one-time ON period of each of the first LED 12-1 and the second LED 12-2. In this case, the exposure time in the one-time ON period may be insufficient depending on the surrounding light level and the characteristics of the image capturing device.

That is, in the one-time ON period, charge cannot sufficiently be accumulated in the image capturing device 10 (reading device 100), which will produce an image with a poor S/N ratio. Under such circumstances, the image reading apparatus 20 waits until charge is sufficiently accumulated through several-time ON periods and then acquires an image.

For example, as illustrated in FIG. 12, in a case in which an image is read when the first LED 12-1 emits light, OFF periods of the first LED 12-1 coincide with ON periods of the second LED 12-2, and the electronic shutter 19 thus shields the image capturing device 10 from light from the second LED 12-2 to prevent an image when the second LED 12-2 emits light from being acquired by the image capturing device 10. Similarly, in a case in which an image is read when the second LED 12-2 emits light, in OFF periods of the second LED 12-2, the electronic shutter 19 shields the image capturing device 10 from light from the first LED 12-1 to prevent an image when the first LED 12-1 emits light from being acquired by the image capturing device 10.

Figure 13:
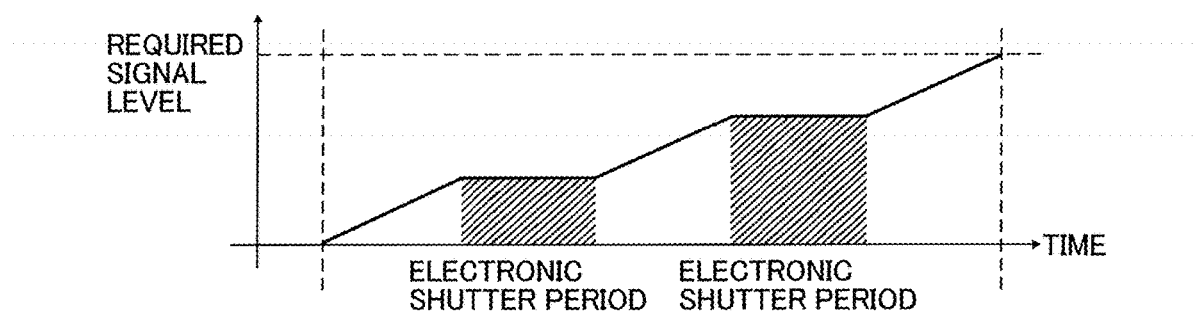
FIG. 13 is an illustration of a state in which charge is accumulated in the image capturing device in several-time ON periods.

FIG. 13 illustrates a state in which charge is accumulated in the image capturing device 10 in the several-time ON periods. The electronic shutter 19 is a liquid crystal shutter, for example. In the liquid crystal, molecules easily move by means of voltage or a magnetic force, and a light transmission state changes. The liquid crystal shutter can electrically control shield and transmission (exposure) with use of this property. FIG. 13 illustrates an example case in which three-time exposure is required to sufficiently accumulate charge in the reading device 100 in the ON periods of the first LED 12-1 or the second LED 12-2.

Figure 14:
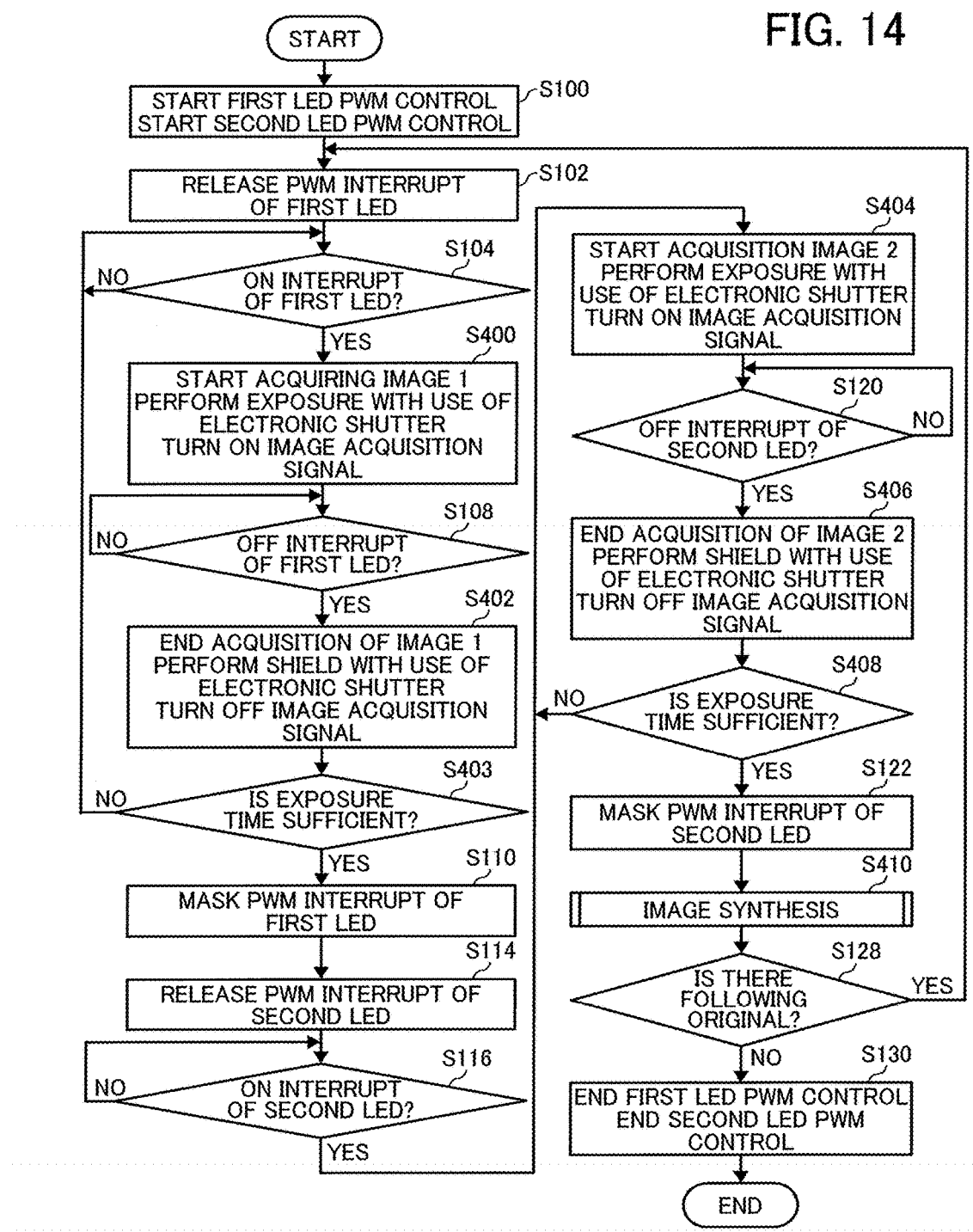
FIG. 14 is a flowchart illustrating a control example in the image reading apparatus.

FIG. 14 is a flowchart illustrating a control example in the image reading apparatus 20. Note that substantially similar steps in FIG. 14 to the steps in FIG. 7 are provided with the same step numerals.

At S400, the illumination controller 170 performs exposure with use of the electronic shutter 19 and starts acquiring image 1. At S402, the illumination controller 170 performs shield with use of the electronic shutter 19 and ends acquisition of image 1.

The illumination controller 170 determines whether or not exposure time is sufficient (S403). The illumination controller 170 returns to S104 in a case in which the exposure time is not sufficient ("NO" at S403) and proceeds to step S110 in a case in which the exposure time is sufficient ("YES" at S403).

At S404, the illumination controller 170 performs exposure with use of the electronic shutter 19 and starts acquiring image 2. AtvS406, the illumination controller 170 performs shield with use of the electronic shutter 19 and ends acquisition of image 2.

The illumination controller 170 determines whether or not exposure time is sufficient (S408). The illumination controller 170 returns to S116 in a case in which the exposure time is not sufficient ("NO" at S408) and moves to step S122 in a case in which the exposure time is sufficient ("YES" at S408). Subsequently, the image synthesizer 15 compares pixel values of acquired image 1 and image 2 and synthesizes a read image with no influence of specular light in accordance with the control of the illumination controller 170 (S410). That is, the image reading apparatus 20 switches between the first LED 12-1 and the second LED 12-2 and switches between exposure and shield with use of the electronic shutter 19 each time of acquiring an image from each of the irradiation positions.

Figure 15:
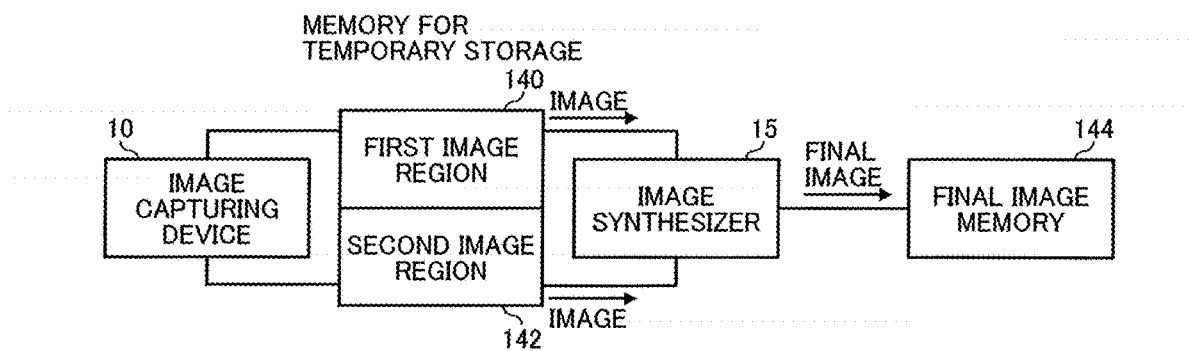
FIG. 15 is an illustration for explaining a flow of an image in the image reading apparatus, according to an embodiment.

FIG. 15 schematically illustrates a flow of an image (image data) in the image reading apparatus 20. Note that a first image region 140, a second image region 142, and a final image memory 144 correspond to storage areas in the memory 14.

An image captured by the image capturing device 10 when the first LED 12-1 emits light is temporarily stored in the first image region 140. An image captured by the image capturing device 10 when the second LED 12-2 emits light is temporarily stored in the second image region 142. The image synthesizer 15 compares the images pixel by pixel, synthesizes the images, and causes one read image (final image) to be stored in the final image memory 144.

In this manner, according to the present embodiment, even in a case in which charge cannot sufficiently be accumulated in the image capturing device in a one-time ON period depending on the surrounding light level and the characteristics of the image capturing device, the image reading apparatus 20 waits until charge is sufficiently accumulated through several-time ON periods and then acquires an image. Accordingly, charge can sufficiently be accumulated in the image capturing device.

Next, a third embodiment will be described. Note that similar components to the components in the above first embodiment and the above second embodiment are provided with the same reference numerals, and description of the same components is omitted.

In the second embodiment, in a case in which exposure time is insufficient, the image reading apparatus 20 waits until charge is sufficiently accumulated and then acquires an image. In the present embodiment, regardless of sufficiency of charge accumulation, an image exposed with light from a light source in a one-time ON period is repetitively acquired a required number of times, and the arithmetic average of these images is derived.

Figure 16:
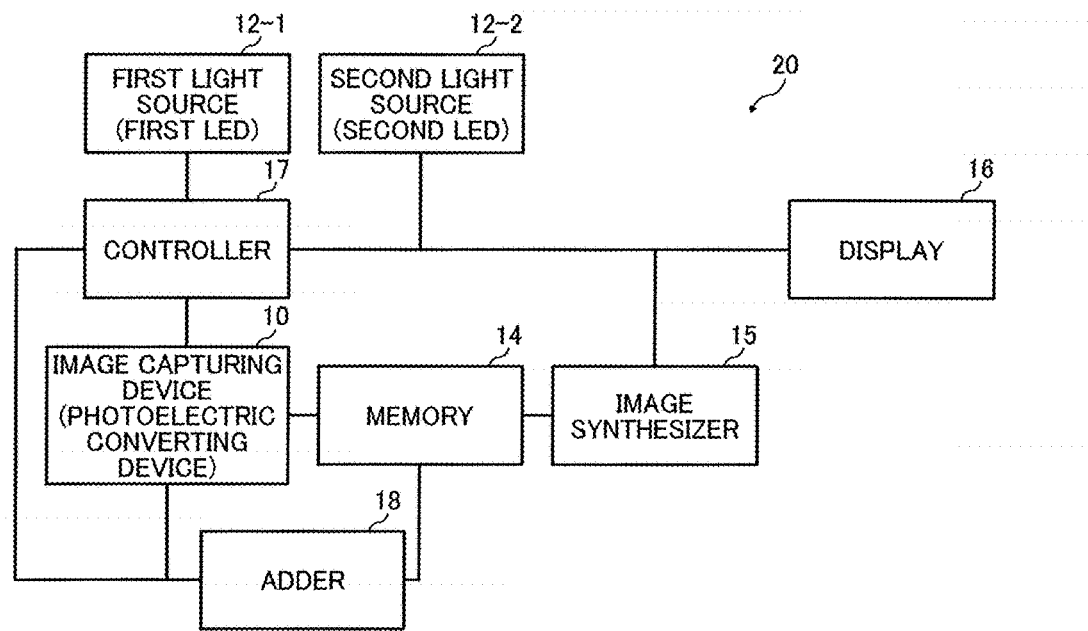
FIG. 16 is a block diagram illustrating an overview of arrangement of an image reading apparatus according to a third embodiment.

FIG. 16 is a block diagram illustrating an overview of arrangement of the image reading apparatus 20 according to the third embodiment. As illustrated in FIG. 16, the image reading apparatus 20 includes the image capturing device (photoelectric converting device) 10, the first light source (first LED) 12-1, the second light source (second LED) 12-2, the memory 14, the image synthesizer 15, the display 16, the controller 17, and an adder 18. The image reading apparatus 20 aims to prevent the flicker caused by lighting-up and blackout of the first LED 12-1 and the second LED 12-2 from making the user feel uncomfortable. Note that substantially similar components of the image reading apparatus 20 illustrated in FIG. 16 to the components described above are provided with the same reference numerals.

As described below, the adder 18 adds a preset number of times read images output by the image capturing device 10 several times per irradiation position (that is, for each of the first LED 12-1 and the second LED 12-2). Note that the image reading apparatus 20 may not include the adder 18.

Figure 17:
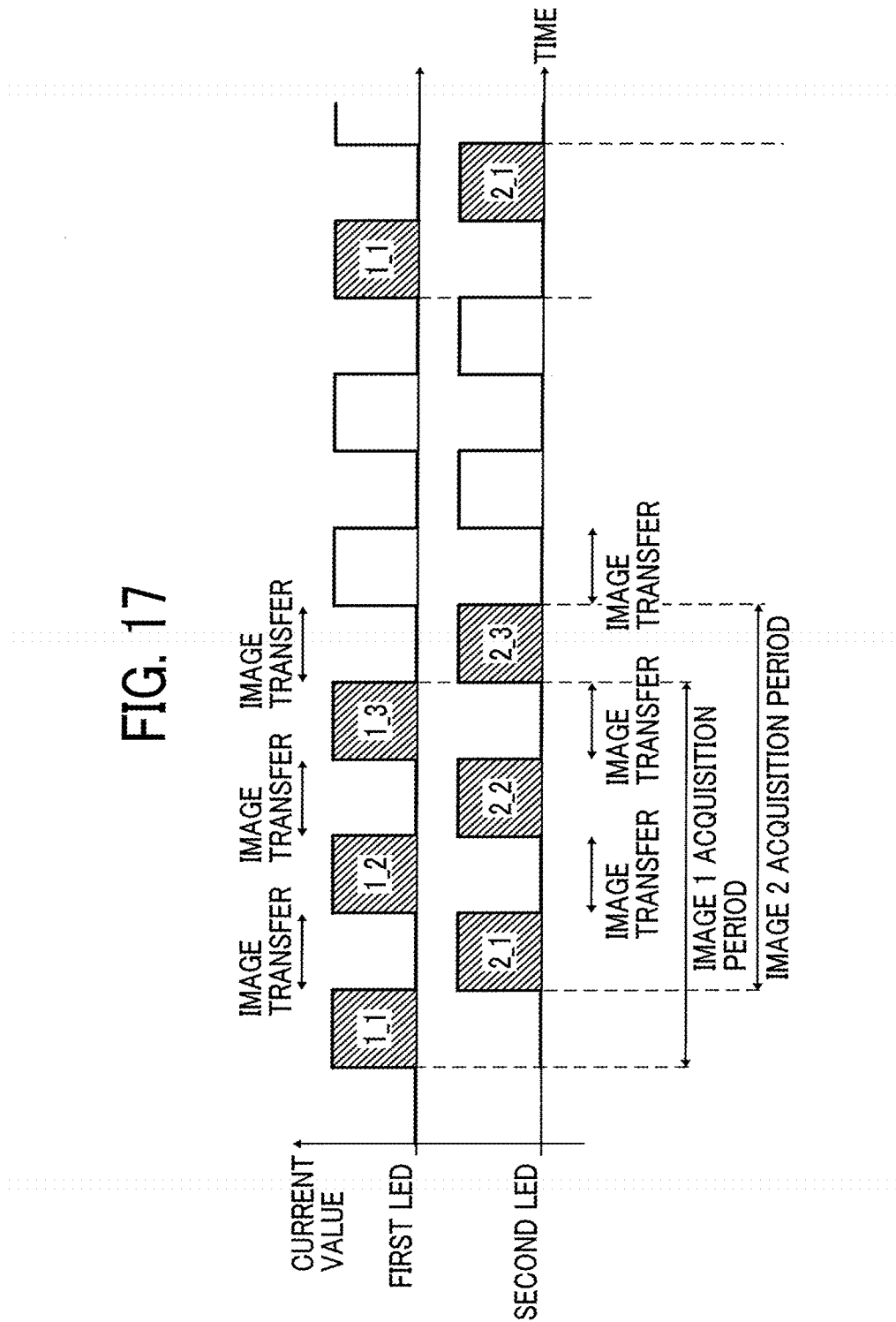
FIG. 17 is a timing chart illustrating a control example performed by the illumination controller of the image reading apparatus.

Next, another control example performed by the illumination controller 170 will be described. FIG. 17 is a timing chart illustrating the control example performed by the illumination controller 170 of the image reading apparatus 20. In this example, the image capturing device 10 outputs an image per one-time ON period of the first LED 12-1 or the second LED 12-2 even when charge accumulation for the image that is being read is halfway. The image capturing device 10 repetitively outputs images a required number of times. The adder 18 derives the arithmetic average of these images in accordance with control of the illumination controller 170, and the image reading apparatus 20 acquires a read image. Although each image exposed in each period has a poor S/N ratio, a required image quality can be obtained by deriving the arithmetic average of these images.

An OFF period of the first LED 12-1 coincides with an ON period of the second LED 12-2. During the period, the image capturing device 10 outputs an image exposed from the irradiation position of the second LED 12-2. That is, the image capturing device 10 can output images from the respective irradiation positions of the first LED 12-1 and the second LED 12-2 concurrently. Accordingly, the image reading apparatus 20 does not have to be provided with the electronic shutter 19 described in the second embodiment, to acquire a required image in a shorter time than a time required by the image reading apparatus 20 in the second embodiment.

Figure 18:
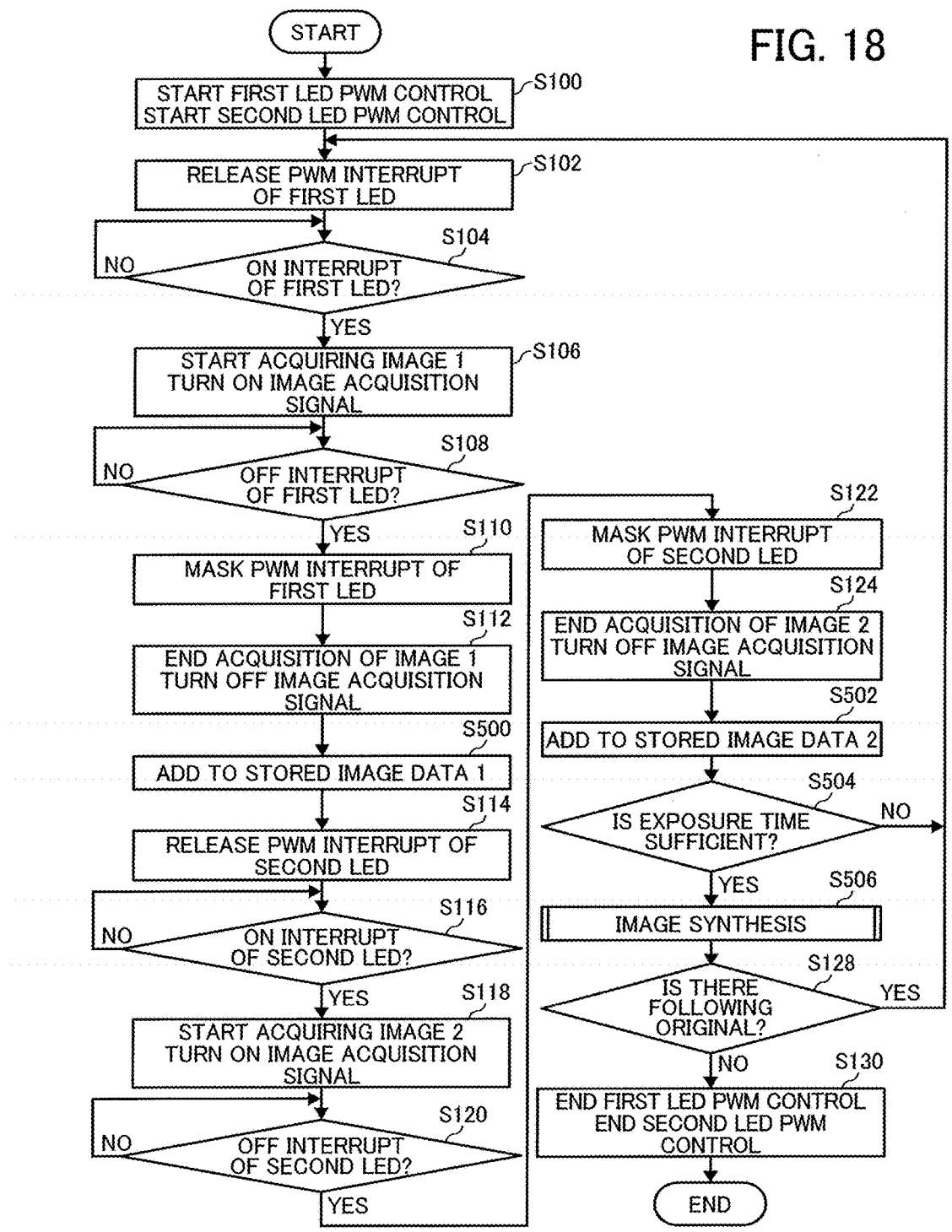
FIG. 18 is a flowchart illustrating a control example in the image reading apparatus illustrated in FIG. 17.

FIG. 18 is a flowchart illustrating operation of controlling, performed by the image reading apparatus 20 illustrated in FIG. 17. At S500, the adder 18 adds image data 1 output by the image capturing device 10 to image data 1 stored in the memory 14. In step 502 (S502), the adder 18 adds image data 2 output by the image capturing device 10 to image data 2 stored in the memory 14.

The illumination controller 170 determines whether or not exposure time for a read image is sufficient (S504). The illumination controller 170 returns to S102 in a case in which the exposure time is not sufficient ("NO" at S504) and proceeds to S506 in a case in which the exposure time is sufficient ("YES" at S504). Subsequently, the image synthesizer 15 compares pixel values of acquired image 1 and image 2 and synthesizes a read image with no influence of specular light in accordance with the control of the illumination controller 170 (S506).

Figure 19:
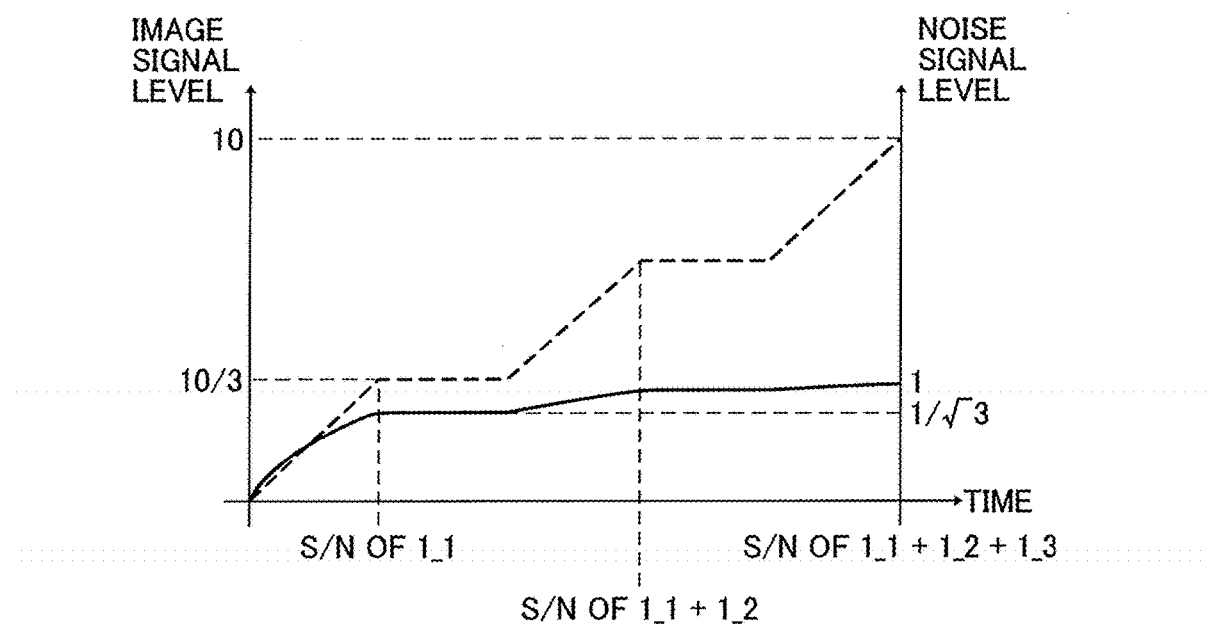
FIG. 19 is a graph indicating a state in which images exposed in several-time ON periods are added in the control example in the image reading apparatus illustrated in FIG. 17.

FIG. 19 illustrates a state in which images exposed in several-time ON periods are added in the control example in the image reading apparatus 20 illustrated in FIG. 17. For example, in a case in which the S/N of an image acquired by one-time output is 10:1=10, the S/N of each exposed image when acquisition is performed three times is approximately $10/3:1/\sqrt{3} \approx 5.774$, which is poor. However, in a case in which three exposed images are averaged, which differs from simple addition (in the case of addition, the S/N does not change), the S/N is $10:3/\sqrt{3} \times (1/\sqrt{3}) = 10:1$, which is equivalent to the S/N in a case in which an image having a high quality is output in a one-time period.

Figure 20:
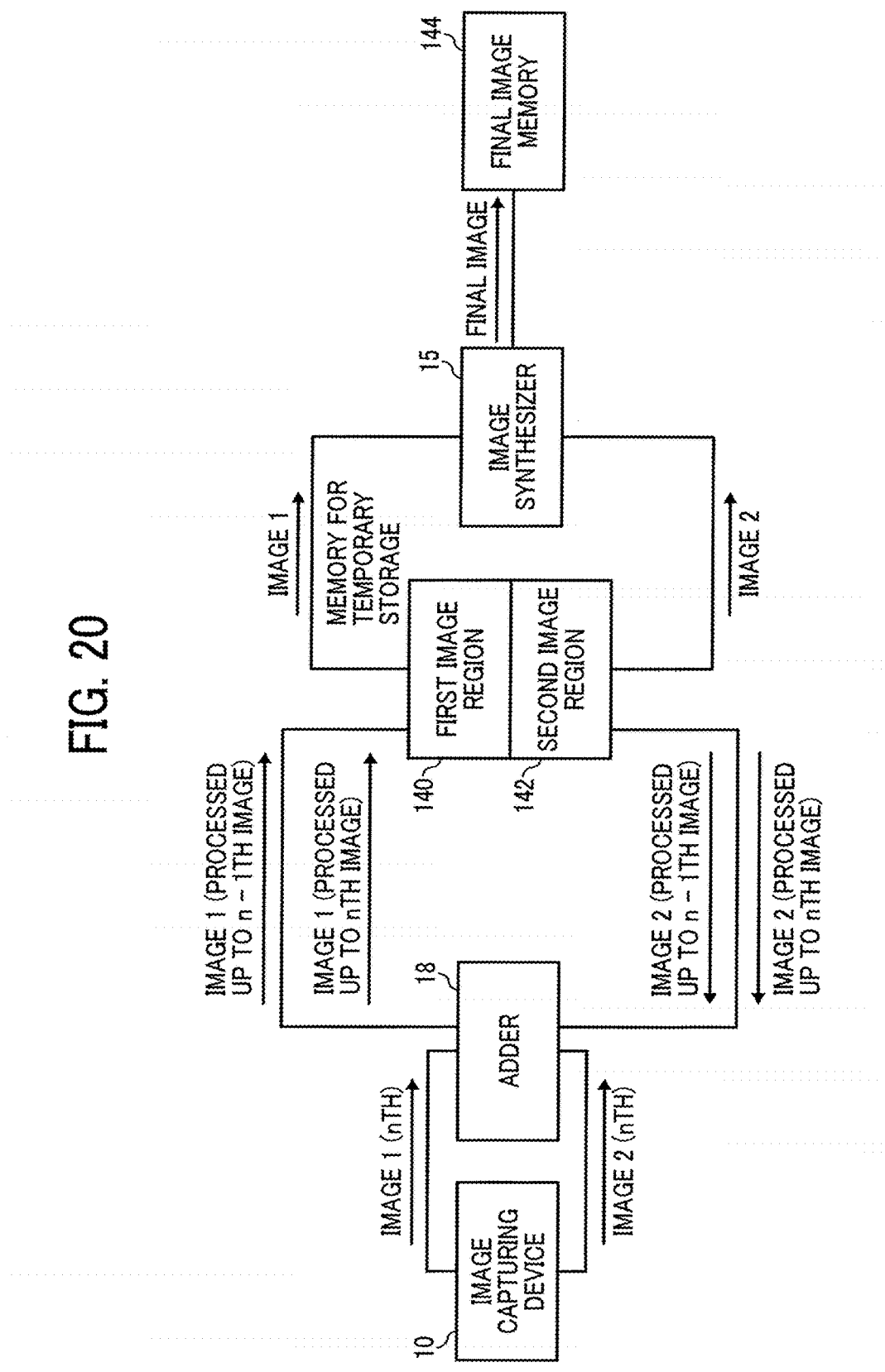
FIG. 20 is an illustration for explaining a flow of an image in the control example in the image reading apparatus, according to an embodiment.

FIG. 20 schematically illustrates a flow of an image (image data) in the control example in the image reading apparatus 20. An image output by the image capturing device 10 in a one-time ON period is transferred to the adder 18 each time in the middle of transfer to a memory for temporary storage (the first image region 140 or the second image region 142), is subject to an arithmetic average operation with a previous image, and is stored in the memory. Subsequently, images for the respective irradiation positions of the first LED 12-1 and the second LED 12-2 are synthesized by the image synthesizer 15, and a synthesized image is stored in the final image memory 144.

In this manner, the image capturing device 10 outputs a read image captured each time either the first LED 12-1 or the second LED 12-2 irradiates a read target with light. The adder 18 adds read images output by the image capturing device 10 several times per irradiation position a preset number of times. The memory 14 stores read images added per irradiation position by the adder 18.

In this manner, according to the present embodiment, even in a case in which charge cannot sufficiently be accumulated in the image capturing device in a one-time ON period depending on the surrounding light level and the characteristics of the image capturing device, regardless of sufficiency of charge accumulation, an image exposed with light from a light source in a one-time ON period is repetitively acquired a required number of times, and the arithmetic average of these images is derived. Accordingly, an image having an equivalent quality to the quality in a case in which charge is sufficiently accumulated can be obtained.

Next, a fourth embodiment will be described. Note that similar components to the components in the above first embodiment and the above second embodiment are provided with the same reference numerals, and description of the same components is omitted.

In the first embodiment and the second embodiment, images of one page, respectively obtained with the two light sources (the first LED 12-1 and the second LED 12-2), are stored in respective memories for temporary storage. In the present embodiment, a memory for storage of an image for the second LED 12-2 is eliminated.

Figure 21:
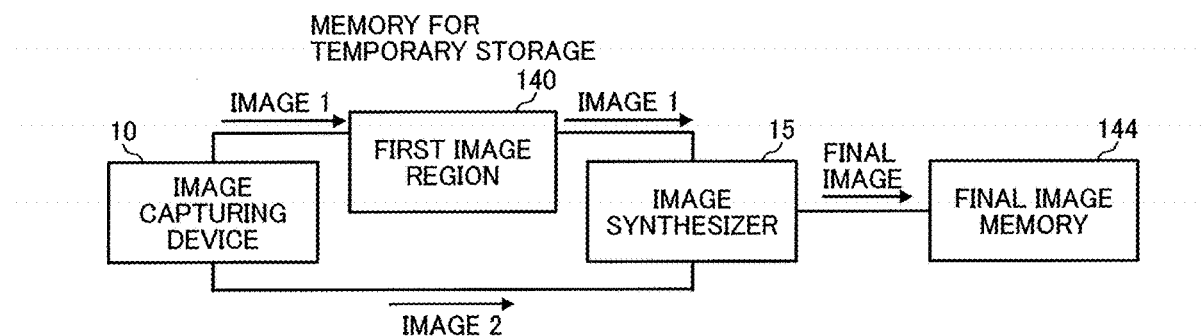
FIG. 21 is an illustration for explaining a flow of an image in a control example in an image reading apparatus according to a fourth embodiment.

FIG. 21 schematically illustrates a flow of an image (image data) in a control example in the image reading apparatus 20 according to the fourth embodiment. In this case, the controller 17 stores an image irradiated from the irradiation position of the first LED 12-1 in the first image region 140 (memory for temporary storage). As for an image irradiated from the irradiation position of the second LED 12-2, several pixels are transferred each time, are input into the image synthesizer 15, and are synthesized with image 1 input from the first image region 140. A synthesized image is stored in the final image memory 144. This control may be performed by the image reading apparatus 20 including no adder 18.

In this manner, according to the present embodiment, the memory for storage of the image for the second LED 12-2 can be eliminated.

Next, a fifth embodiment will be described. Note that similar components to the components in the above first embodiment to the above fourth embodiment are provided with the same reference numerals, and description of the same components is omitted.

In the present embodiment, the light levels of the two light sources, the first LED 12-1 and the second LED 12-2, are adjustable.

Figure 22:
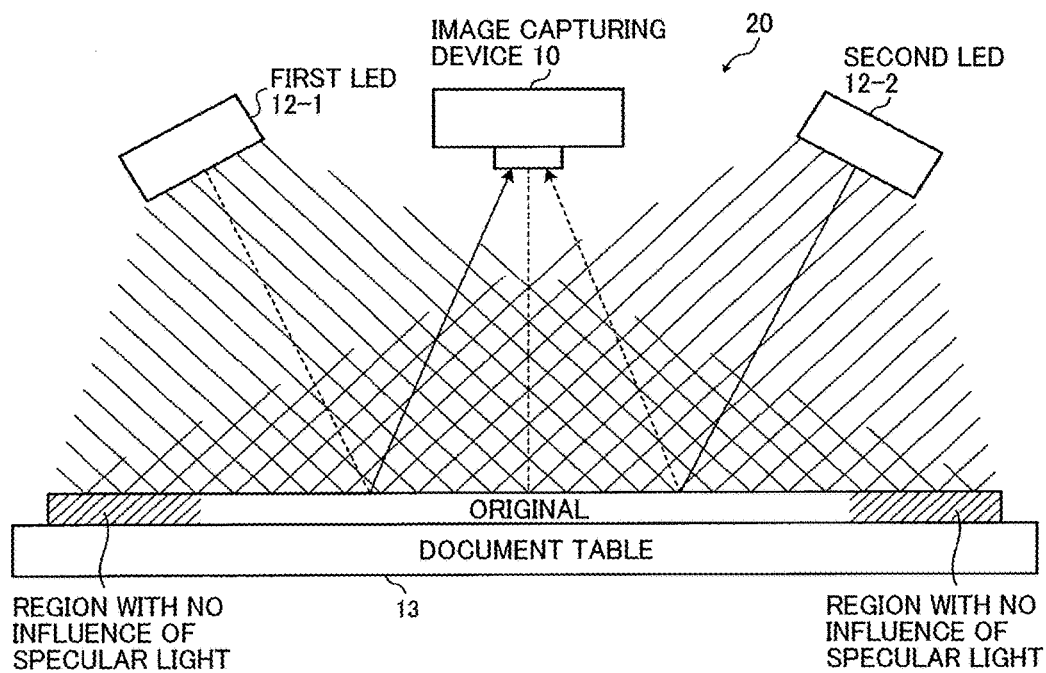
FIG. 22 is an illustration for explaining light irradiation ranges of the first LED and the second LED in an image reading apparatus according to a fifth embodiment.

FIG. 22 illustrates light irradiation ranges of the first LED 12-1 and the second LED 12-2 in the image reading apparatus 20 according to the fifth embodiment. Normally, since an image irradiated from the irradiation position of the first LED 12-1 (image 1) and an image irradiated from the irradiation position of the second LED 12-2 (image 2) are influenced by ambient light and variation of LED characteristics, equal image qualities cannot be obtained even in a part other than a specular region. In view of the above, a preset standard original is read, and the light levels of the first LED 12-1 and the second LED 12-2 are adjusted in advance so that acquired images may have equal image qualities.

Figure 23A:
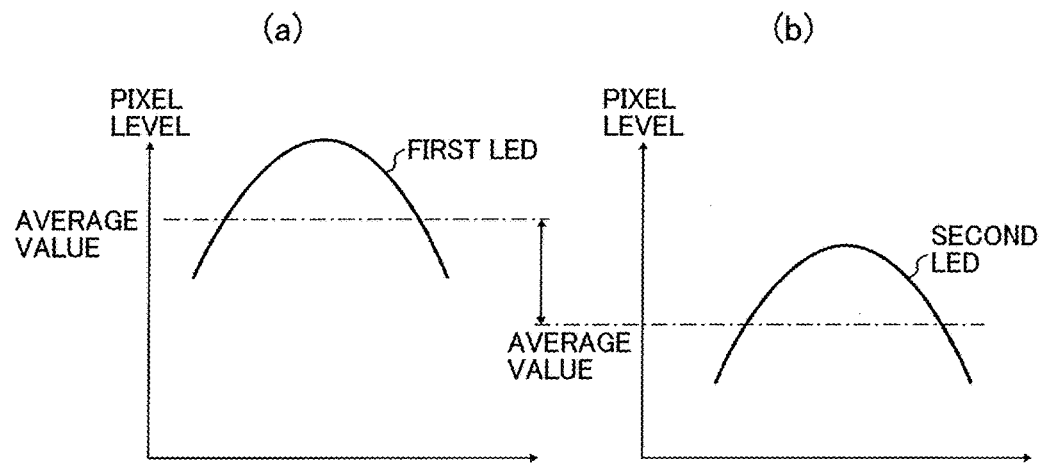
FIGS. 23A and 23B is an illustration for explaining control performed by the illumination controller, according to an embodiment.
Figure 23B:
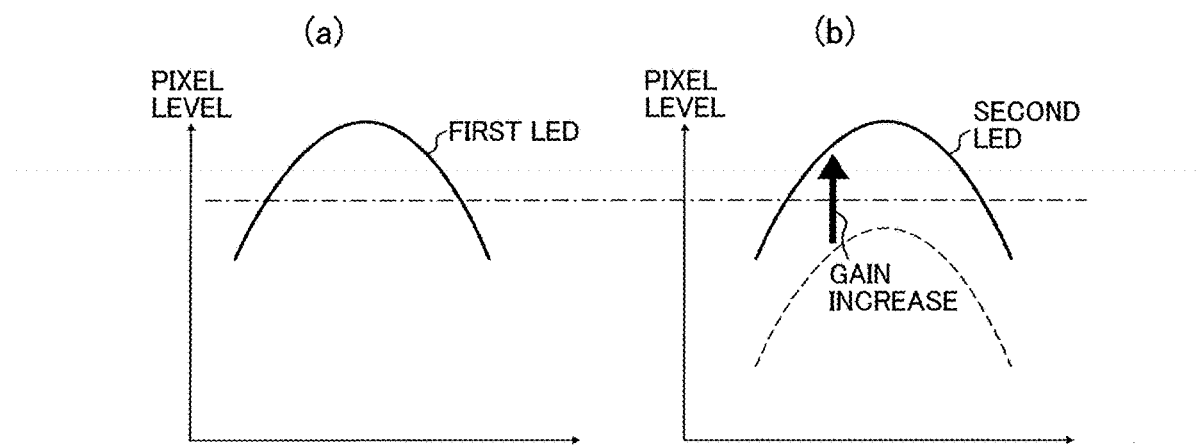

However, the light level of the LEDs may fluctuate even after the adjustment. Under such circumstances, the illumination controller 170 derives an average value of all pixels in regions with no influence of specular light (shaded regions in FIG. 22) in each of the two acquired images, and in a case in which a difference between the average values of the two images is a threshold value or higher, the illumination controller 170 determines that any environmental fluctuation occurs. As illustrated in FIGS. 23A and 23B, the illumination controller 170 raises the light level of the LED having the lower average value or lowers the light level of the LED having the higher average value to do adjustment so that the two image qualities may be equal.

Figure 24:
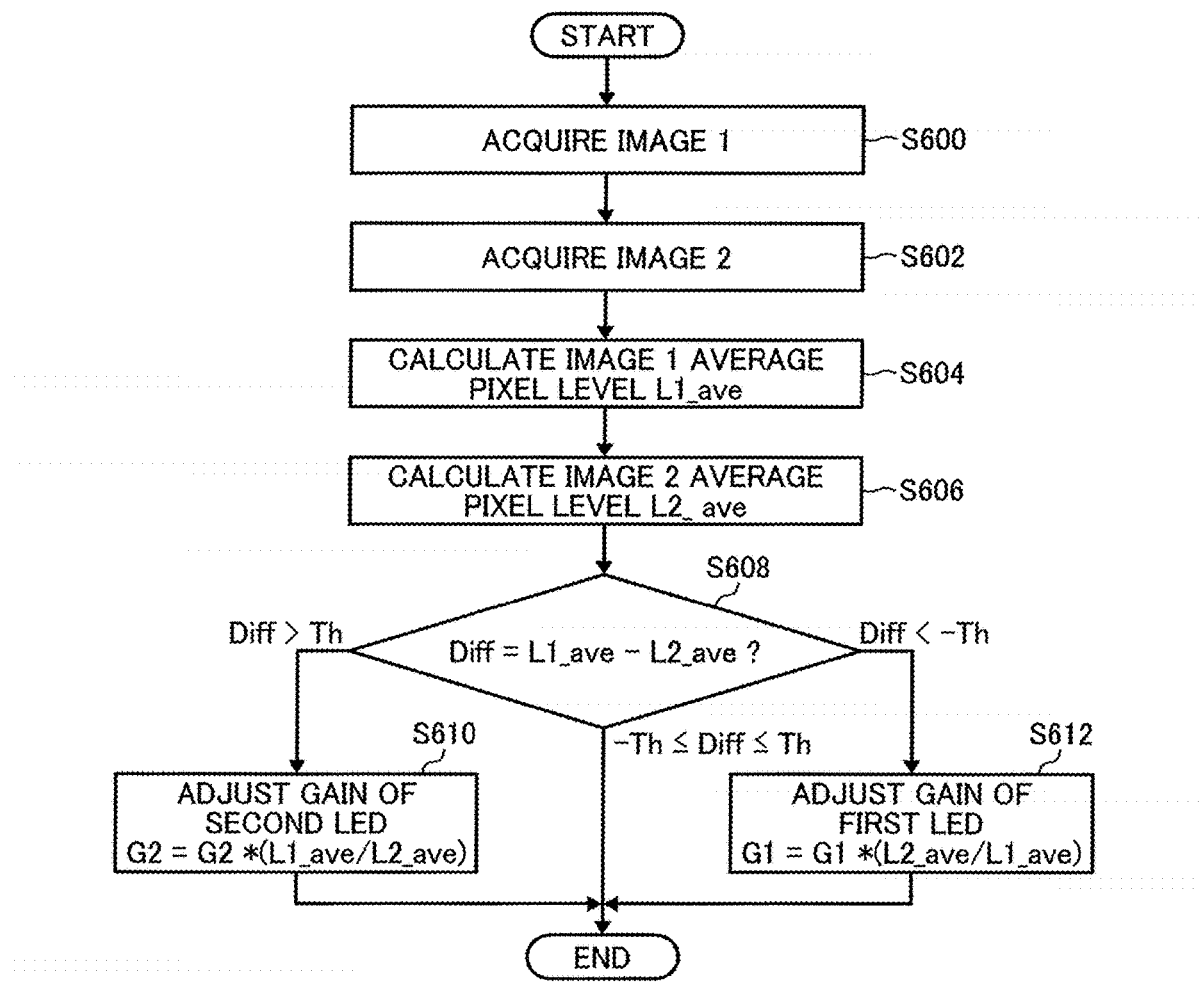
FIG. 24 is a flowchart illustrating control of the illumination controller illustrated in FIG. 23.

FIG. 24 is a flowchart illustrating control of the illumination controller 170 illustrated in FIG. 23. The image reading apparatus 20 acquires image 1 and image 2 (S600 and S602) and then calculates average pixel levels of these images (S604 and S606). Pixels used at this time are pixels in the regions with no influence of specular light illustrated in FIG. 22, for example.

Since image 1 and image 2 are images of the same original, the average pixel levels of the regions with no influence of specular light in image 1 and image 2 are assumed to be equal, or a difference between the average pixel levels is assumed to fall within a preset range. However, in a case in which any environmental fluctuation such as a change of ambient light occurs, the difference will not fall within the preset range. In this case, a difference between the average pixel levels of the images (Diff) is calculated (S608), and a ratio of the average pixel levels of the images is calculated in accordance with the calculated difference and is set as a gain adjustment value for the LEDs. The light level of the LEDs is adjusted with use of the gain adjustment value (S610 or S612). Accordingly, the image reading apparatus 20 restricts the image fluctuation of image 1 and image 2.

In this manner, the illumination controller 170 calculates the difference between the average pixel values of the set regions in the read images captured by the image capturing device 10 when the first LED 12-1 and the second LED 12-2 irradiate the read target with light, and in a case in which the calculated difference is higher than a predetermined threshold value (or a predetermined threshold value or higher), the light level of at least either the first LED 12-1 or the second LED 12-2 is changed in accordance with the calculated difference.

Also, the image reading apparatus 20 may do adjustment by differentiating the respective ON/OFF cycles of the first LED 12-1 and the second LED 12-2 by means of the PWM control of the illumination controller 170. For example, in a case in which the light level of the second LED 12-2 is more than the light level of the first LED 12-1, the illumination controller 170 narrows the pulse width of the LED irradiating the brighter image as illustrated in FIG. 25.

In this manner, according to the present embodiment, the quality fluctuation of the images irradiated by the two light sources, the first LED 12-1 and the second LED 12-2, can be restricted.

Next, a sixth embodiment will be described. Note that similar components to the components in the above first embodiment to the above fifth embodiment are provided with the same reference numerals, and description of the same components is omitted.

In the fifth embodiment, the LED light level is adjusted so that the image qualities of the images irradiated by the two light sources, the first LED 12-1 and the second LED 12-2, may be equal. In the present embodiment, the exposure light level is adjusted so that the image qualities of the images irradiated by the two light sources, the first LED 12-1 and the second LED 12-2, may be equal.

Figure 27:
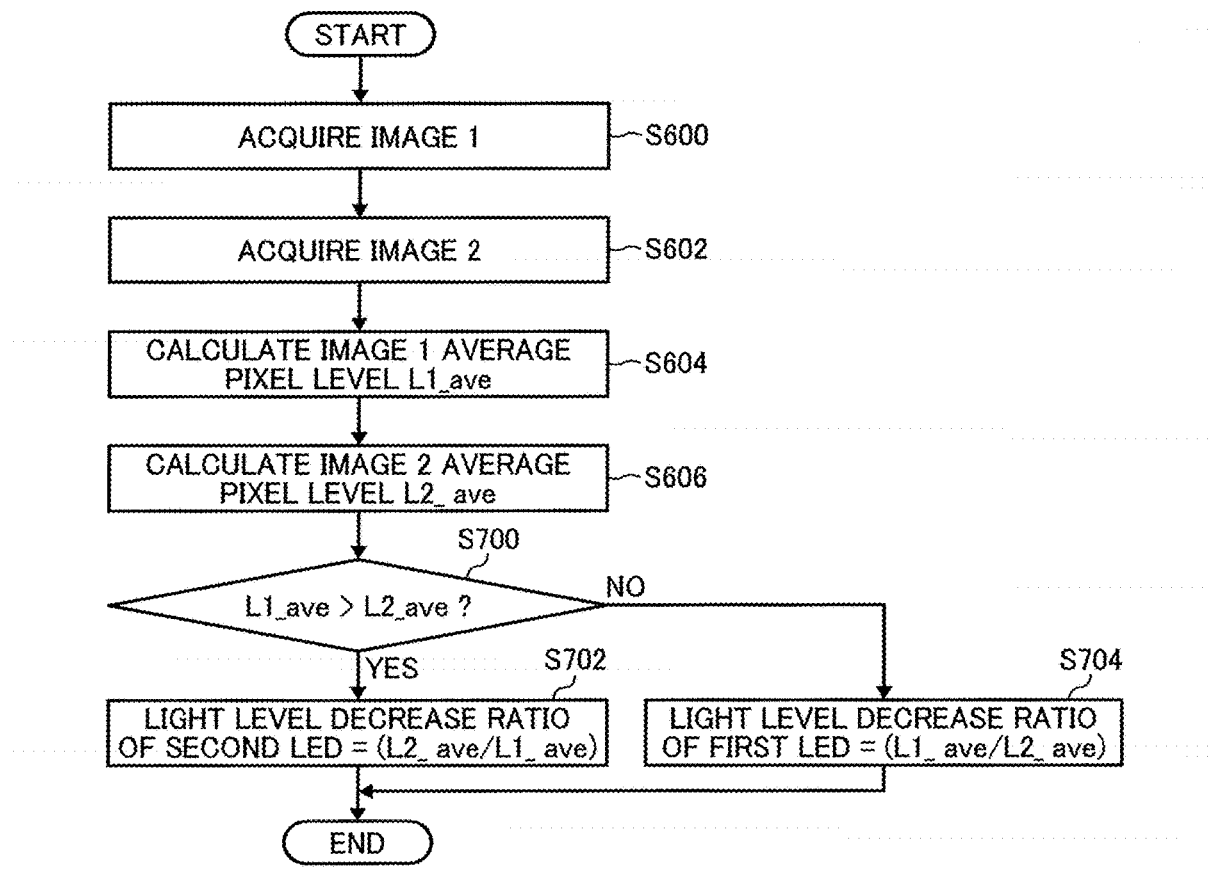
FIG. 27 is a flowchart illustrating processing in which an image reading apparatus according to a sixth embodiment determines a light level decrease ratio of the first LED or the second LED.

FIG. 27 is a flowchart illustrating processing in which the image reading apparatus 20 according to the sixth embodiment determines a light level decrease ratio of the first LED 12-1 or the second LED 12-2.

The image reading apparatus 20 may correct the difference between the average pixel levels of image 1 and image 2 by adjusting the exposure time instead of changing the LED light level. For example, in a case in which the image reading apparatus 20 has determined that the light level of the second LED 12-2 is lower, the image reading apparatus 20 extends the exposure time for the image irradiated from the irradiation position of the second LED 12-2 to secure a required image quality. Specifically, the illumination controller 170 sets the number of times of exposing the image capturing device 10 to image 2 to be larger than the number of times of exposing the image capturing device 10 to image 1 to extend an acquisition period of image 2 as illustrated in FIGS. 26A and 26B.

In this manner, the illumination controller 170 calculates the difference between the average pixel values of the set regions in the read images captured by the image capturing device 10 when the first LED 12-1 and the second LED 12-2 irradiate the read target with light, and in a case in which the calculated difference is higher than a predetermined threshold value (or a predetermined threshold value or higher), the exposure time of the image capturing device 10 to at least one irradiation position is changed in accordance with the calculated difference.

As illustrated in FIG. 27, the illumination controller 170 compares the average pixel levels of image 1 and image 2 (S700). In a case in which the average pixel level of image 1 is higher ("YES" at S702), the illumination controller 170 determines that the light level of the second LED 12-2 has decreased (S702). In a case in which the average pixel level of image 2 is higher ("NO" at S702), the illumination controller 170 determines that the light level of the first LED 12-1 has decreased (S704).

How to determine the extension time of the exposure time is illustrated in Table 1.

TABLE 1

| Light level of second LED | Exposure time (number of times of acquisition during ON) |
|---|---|
| 100% | 30/1.0 = 30 ms (three times) |
| Decreased to 99% | 30/0.99 = 30.3 ms (four times) |
| ... | ... |
| Decreased to 1% | 30/0.01 = (300 times) |
| Decreased to 0% | LED abnormality. Stop reading. |

Table 1 illustrates a case in which the exposure time in a case in which the LED light level does not decrease is 30 ms and in which the light level of the first LED 12-1 is higher than the light level of the second LED 12-2. As illustrated in Table 1, the illumination controller 170 acquires a predetermined number of times of output of the image capturing device 10 in accordance with the degree of a decrease of the light level of the first LED 12-1 or the second LED 12-2.

Further, the image reading apparatus 20 may correct the difference between the average pixel levels of image 1 and image 2 by adjusting the number of times of acquisition of image 1 and image 2 instead of adjusting the exposure time. That is, the image reading apparatus 20 adjusts the number of exposed images to be acquired as illustrated in FIG. 28. For example, in a case in which the illumination controller 170 has determined that the light level of the second LED 12-2 is lower, the illumination controller 170 increases the number of exposed images to be acquired irradiated from the irradiation position of the second LED 12-2 to secure a required image quality. The number of images may be determined using a method illustrated in Table 1.

In this manner, the illumination controller 170 calculates the difference between the average pixel values of the set regions in the read images captured by the image capturing device 10 when the first LED 12-1 and the second LED 12-2 irradiate the read target with light, and in a case in which the calculated difference is higher than a predetermined threshold value (or a predetermined threshold value or higher), the number of times of addition performed by the adder 18 is changed in accordance with the calculated difference.

Further, in a case in which a change of the light level of the first LED 12-1 or the second LED 12-2 exceeds an upper or lower limit value for the light level that can be adjusted, the image reading apparatus 20 may determine that a failure that cannot secure a required image quality has occurred and display an error message on the display 16. For example, the upper or lower limit threshold value for the light level that can be adjusted is determined by an image quality evaluation or the like, and the illumination controller 170 may regard a case in which the light level is 40% or less as an error.

Figure 29:
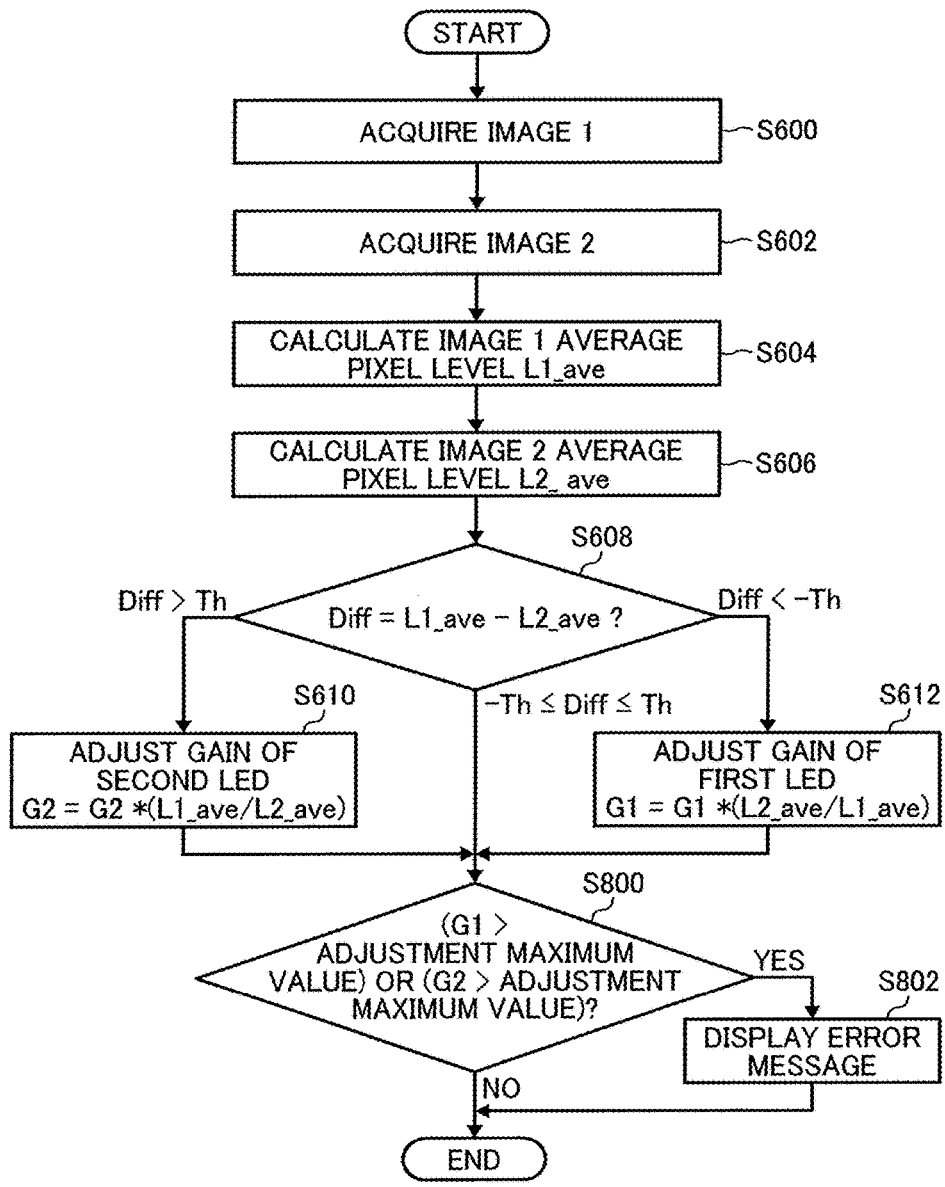
FIG. 29 is a flowchart illustrating a processing example in a case in which the image reading apparatus displays an error message in accordance with the light level of the first LED or the second LED.

FIG. 29 is a flowchart illustrating a processing example in a case in which the image reading apparatus 20 displays an error message in accordance with the light level of the first LED 12-1 or the second LED 12-2. The illumination controller 170 determines whether or not the light level has exceeded the upper or lower limit value for the light level that can be adjusted of the first LED 12-1 or the second LED 12-2 (S800). In a case in which the illumination controller 170 has determined that the light level has exceeded the upper or lower limit value ("YES" at S800), the image reading apparatus 20 determines that a failure that cannot secure a required image quality has occurred and displays an error message or the like on the display 16 (S802).

Whether to display the error message is determined as illustrated in Table 2.

TABLE 2

| Light level of second LED | Display of error message |
|---|---|
| Decreased to 99% to 41% | Error message not displayed |
| Decreased to 40% to 0% | Error message displayed |

As described above, in a case in which the light level is 40% or less, the illumination controller 170 displays the error message on the display 16 based on the criteria illustrated in Table 2, for example. That is, when the light level of at least one light source, the first LED 12-1 or the second LED 12-2, is changed, the illumination controller 170 determines whether or not the difference between the average pixel levels of the set regions in the read images can be smaller than the predetermined value (or the predetermined value or smaller). In a case in which the illumination controller 170 has determined that the difference between the average pixel levels of the set regions in the read images cannot be smaller than the predetermined value (or the predetermined value or smaller), the display 16 displays the message.

In this manner, according to the present embodiment, the quality fluctuation of the images irradiated by the two light sources, the first LED 12-1 and the second LED 12-2, can be restricted.

Next, a seventh embodiment will be described. Note that similar components to the components in the above first embodiment are provided with the same reference numerals, and description of the same components is omitted.

Unlike the aforementioned first embodiment, in which the image reading apparatus 20 turns on the second LED 12-2 after turning off the first LED 12-1, in the seventh embodiment, lighting control (lighting-up and blackout timing) of the two light sources (the first LED 12-1 and the second LED 12-2) is performed so that the two light sources may cooperate with each other. Briefly speaking, in a case in which a lighting-up state is switched from the first LED 12-1 to the second LED 12-2, the image reading apparatus 20 takes control so that the lighting-up states of the first LED 12-1 and the second LED 12-2 may overlap with each other. As a result, the number of lighting-up/blackout patterns of the two light sources (the first LED 12-1 and the second LED 12-2) appears to decrease in the eyes of a person around.

Figure 30:
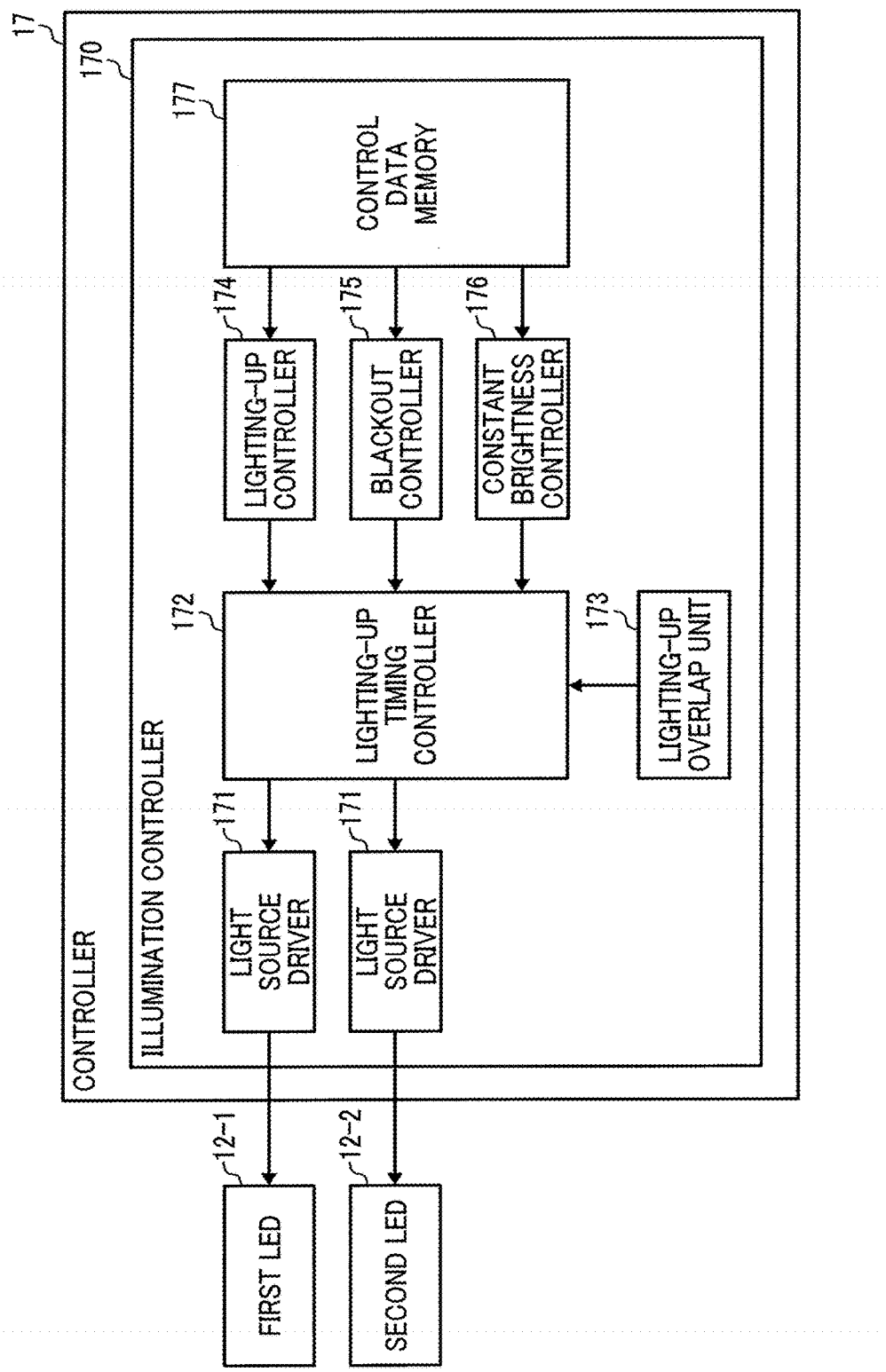
FIG. 30 is a functional block diagram illustrating functions performed by the controller of an image reading apparatus according to a seventh embodiment.

FIG. 30 is a functional block diagram illustrating functions performed by the controller 17 of the image reading apparatus 20 according to the seventh embodiment. As illustrated in FIG. 30, the controller 17 includes the illumination controller 170. The illumination controller 170 includes two light source drivers 171, a lighting-up timing controller 172, a lighting-up overlap unit 173, a lighting-up controller 174, a blackout controller 175, a constant brightness controller 176, and a control data memory 177.

The light source drivers 171 control the driving of the first LED 12-1 and the second LED 12-2 in a PWM (Pulse Width Modulation) light control method, respectively. The PWM control method is a method for turning ON/OFF the first LED 12-1 and the second LED 12-2 with pulses each having a constant frequency. That is, in the PWM light control method, by adjusting a ratio of an ON period to an OFF period of a pulse signal, apparent brightness of the first LED 12-1 and the second LED 12-2 can be changed. In other words, according to the PWM light control method, by adjusting a duty ratio (lighting-up time/cycle time), brightness can be adjusted.

Figure 31A:
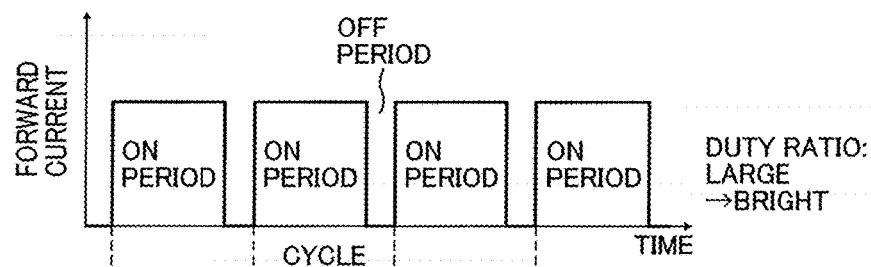
FIGS. 31A to 31C are an illustration for explaining a PWM light control method, according to an embodiment.
Figure 31B:
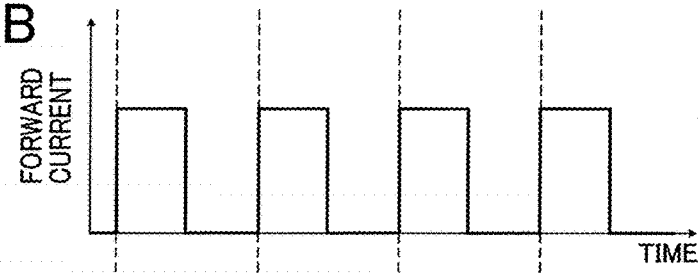
Figure 31C:
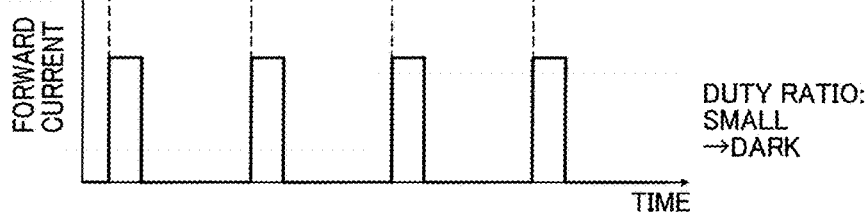
Figure 32:
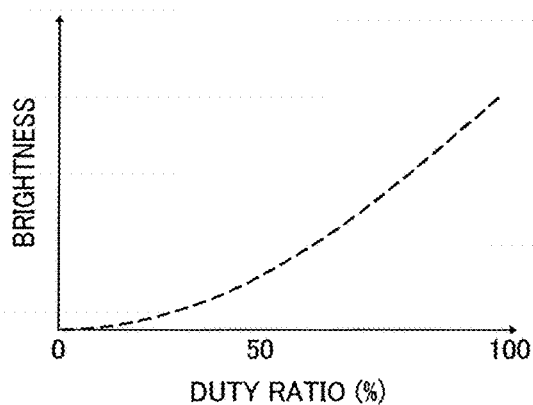
FIG. 32 is a graph illustrating a relationship between a duty ratio and brightness.

FIGS. 31A to 31C illustrate examples of the PWM light control method, and FIG. 32 is a graph illustrating a relationship between the duty ratio and the brightness. The light source drivers 171 change the duty ratio by means of the PWM control to enable brightness of the first LED 12-1 and the second LED 12-2 to be controlled. That is, the light source drivers 171 increase the duty ratio to enable the first LED 12-1 and the second LED 12-2 to be bright and decrease the duty ratio to enable the first LED 12-1 and the second LED 12-2 to be dark.

Since the relationship between the duty ratio and the brightness illustrated in FIG. 32 differs per LED, the relationship is required to be obtained by a data sheet or actual measurement per LED. In a case in which desired LED brightness is to be obtained, the light source drivers 171 drive the LEDs with a corresponding duty ratio based on the relationship to enable brightness control.

In the present embodiment, the light source drivers 171 control the driving of the first LED 12-1 and the second LED 12-2 in the PWM light control method. However, the light control method is not limited to the PWM light control method. For example, the light source drivers 171 control the driving in a DC light control method, in which a current value flowing in the LED is changed to change apparent brightness of the LED. Since the brightness of the LED changes due to current, as more current flows, the light flux (light amount) increases further, and the LED is brighter.

The lighting-up timing controller 172 determines lighting-up timing and blackout timing of the first LED 12-1 and the second LED 12-2 for the two light source drivers 171 to synchronize a lighting condition of the first LED 12-1 with a lighting condition of the second LED 12-2.

The lighting-up overlap unit 173 instructs the lighting-up timing controller 172 on an overlap period and overlap timing to cause a lighting-up state of the first LED 12-1 and a lighting-up state of the second LED 12-2 to overlap with each other. The overlap period and the overlap timing will be described below.

FIGS. 33A and 33B (FIG. 33) illustrate a lighting control example of the first LED 12-1 and the second LED 12-2. As illustrated in FIG. 33, in a case in which a lighting-up state is switched from the first LED 12-1 to the second LED 12-2, the lighting-up overlap unit 173 instructs the lighting-up timing controller 172 on the overlap period and the overlap timing to cause a lighting state of the first LED 12-1 and a lighting state of the second LED 12-2 to overlap with each other in a region C.

The control data memory 177 stores in tables lighting-up/blackout control data used in the lighting-up controller 174, the blackout controller 175, and the constant brightness controller 176. More specifically, in the case of the PWM control, "a lighting-up PWM value table" storing lighting-up control data that the lighting-up controller 174 refers to, "a blackout PWM value table" storing blackout control data that the blackout controller 175 refers to, and "a constant brightness PWM value table" storing lighting-up/blackout control data that the constant brightness controller 176 refers to.

When the first LED 12-1 or the second LED 12-2 is to be turned on, the lighting-up controller 174 refers to "the lighting-up PWM value table" to take control so that the first LED 12-1 or the second LED 12-2 may gradually be brighter.

When the first LED 12-1 or the second LED 12-2 is to be turned off, the blackout controller 175 refers to "the blackout PWM value table" to take control so that the first LED 12-1 or the second LED 12-2 may gradually be darker.

The lighting-up overlap unit 173 generates an (overlap) period in which lighting-up states of the first LED 12-1 and the second LED 12-2 overlap by operating the lighting-up controller 174 and the blackout controller 175.

Figures 34A, 34B, 34C:
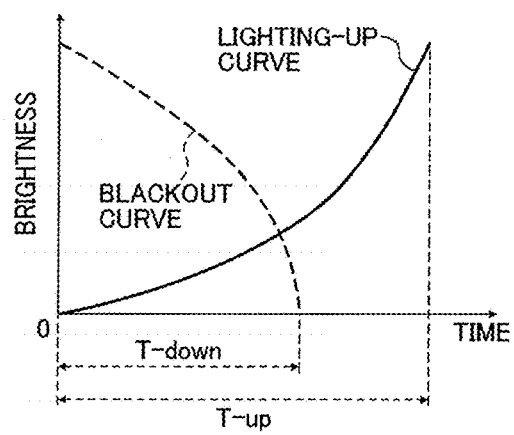
FIGS. 34A to 34C are an illustration of examples of a lighting-up PWM value table and a blackout PWM value table.

FIGS. 34A to 34C illustrate examples of the lighting-up PWM value table and the blackout PWM value table. FIG. 34A illustrates a brightness curve of a lighting-up pattern when the first LED 12-1 is to be turned on and a brightness curve of a blackout pattern when the second LED 12-2 is to be turned off. From the brightness curves illustrated in FIG. 34A, corresponding PWM values are derived, and the PWM value tables for lighting-up and blackout are prepared. As illustrated in FIG. 34B, the lighting-up PWM value table stores PWM values defined by the lighting-up brightness curve in which the first LED 12-1 is gradually brighter when the first LED 12-1 is turned on. Also, as illustrated in FIG. 34C, the blackout PWM value table stores PWM values defined by the blackout brightness curve in which the second LED 12-2 is gradually darker when the second LED 12-2 is turned off.

FIGS. 35A to 35C illustrate an example of the constant brightness PWM value table. FIG. 35A illustrates brightness curves of blackout/lighting-up patterns in the overlap period (region C) illustrated in FIG. 33. The brightness curves of the blackout/lighting-up patterns illustrated in FIG. 35A are curves set so that the entire brightness in the overlap period (region C) may be kept constant when the first LED 12-1 and the second LED 12-2 black out and light up, respectively. FIG. 35B illustrates a relationship between the brightness and the PWM value.

Based on the curves illustrated in FIG. 35A and the relationship between the brightness and the PWM value illustrated in FIG. 35B, PWM values in each step section in the X axis in FIG. 35A are derived, and the constant brightness PWM value table is prepared. As illustrated in FIG. 35C, the constant brightness PWM value table stores PWM values defined by the blackout brightness curve in which the first LED 12-1 is gradually darker when the first LED 12-1 is turned off and PWM values defined by the lighting-up brightness curve in which the second LED 12-2 is gradually brighter when the second LED 12-2 is turned on while the entire brightness in the overlap period (region C) is kept constant.

The constant brightness controller 176 refers to "the constant brightness PWM value table," controls the blackout controller 175 to turn off the first LED 12-1 so that the first LED 12-1 may gradually be darker in the overlap period, and controls the lighting-up controller 174 to turn on the second LED 12-2 so that the second LED 12-2 may gradually be brighter in the overlap period, to control lighting-up and blackout of the first LED 12-1 and the second LED 12-2 to keep constant brightness in the overlap period.

Specifically, the constant brightness controller 176 takes control so that brightness in a region B, brightness in the overlap period (region C), and brightness in a region D illustrated in FIG. 33 may be equal. In the overlap period (region C), the first LED 12-1 is darkened and is turned off by gradually lowering the duty ratio (PWM value), and the second LED 12-2 is brightened by gradually raising the duty ratio (PWM value). The constant brightness controller 176 brightens the second LED 12-2 by raising the duty ratio (PWM value) of the second LED 12-2 as much as the constant brightness controller 176 darkens the first LED 12-1 by lowering the duty ratio (PWM value) of the first LED 12-1 to take control so that brightness in the region B, brightness in the overlap period (region C), and brightness in the region D may be constant (L1).

In this manner, in a case in which the lighting-up state is switched from the first LED 12-1 to the second LED 12-2, the light sources are controlled so as not to change the total brightness of the first LED 12-1 and the second LED 12-2. This prevents flicker due to lighting-up and blackout, which may cause the user feel uncomfortable.

In other words, the lighting-up timing controller 172 performs timing control of the first LED 12-1 and the second LED 12-2 in cooperation with the lighting-up controller 174, the blackout controller 175, and the constant brightness controller 176.

Next, lighting control processing at the time of image reading processing in the image reading apparatus 20 will be described.

Figure 36:
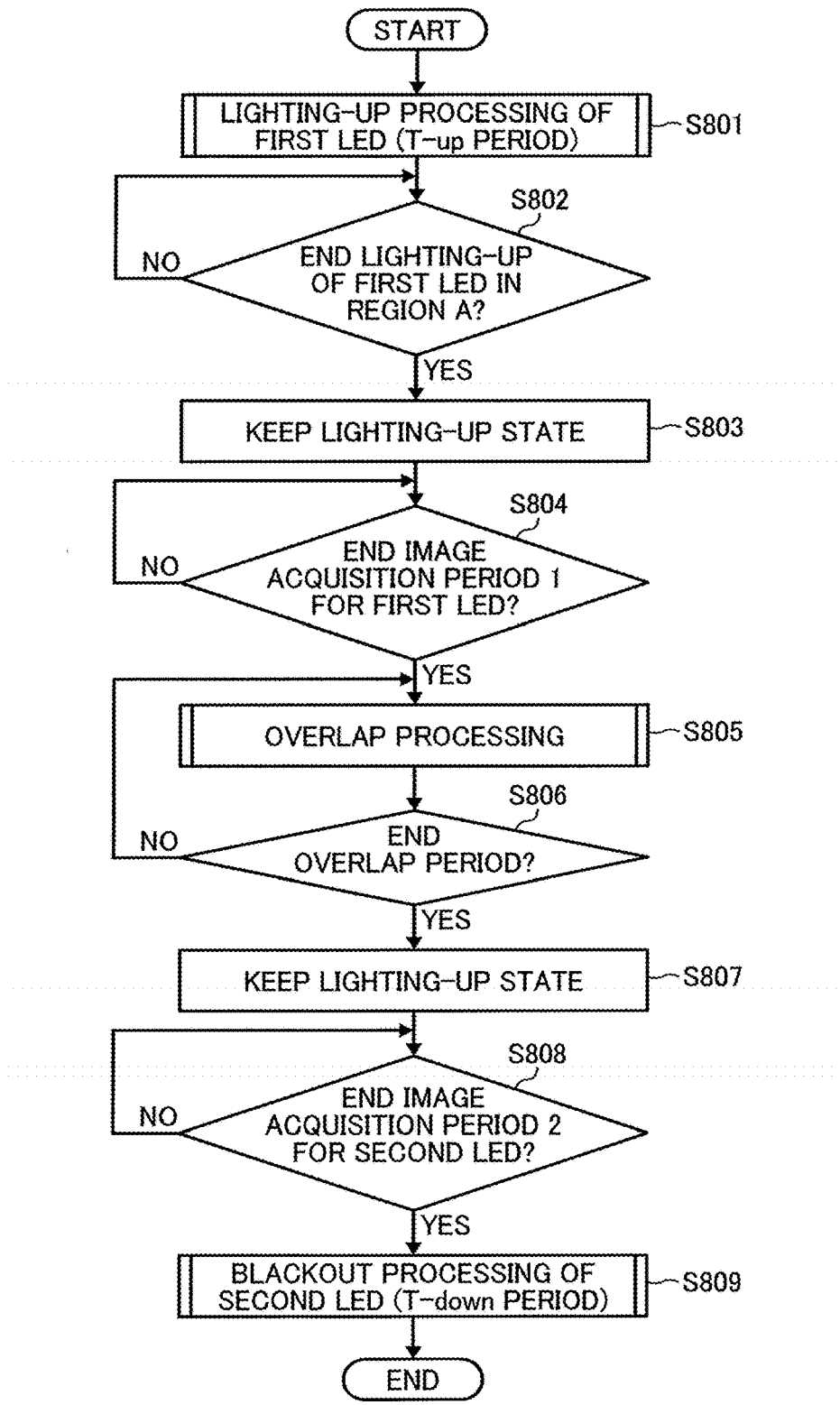
FIG. 36 is a flowchart illustrating operation of lighting control, according to an embodiment.

FIG. 36 is a flowchart illustrating lighting control processing, performed by the image reading apparatus 20 according to the embodiment. As illustrated in FIG. 36, the illumination controller 170 of the image reading apparatus 20 first turns on the first LED 12-1 to gradually raise the duty ratio (PWM value) of the first LED 12-1 in a region A illustrated in FIG. 33 (S801).

Figure 37:
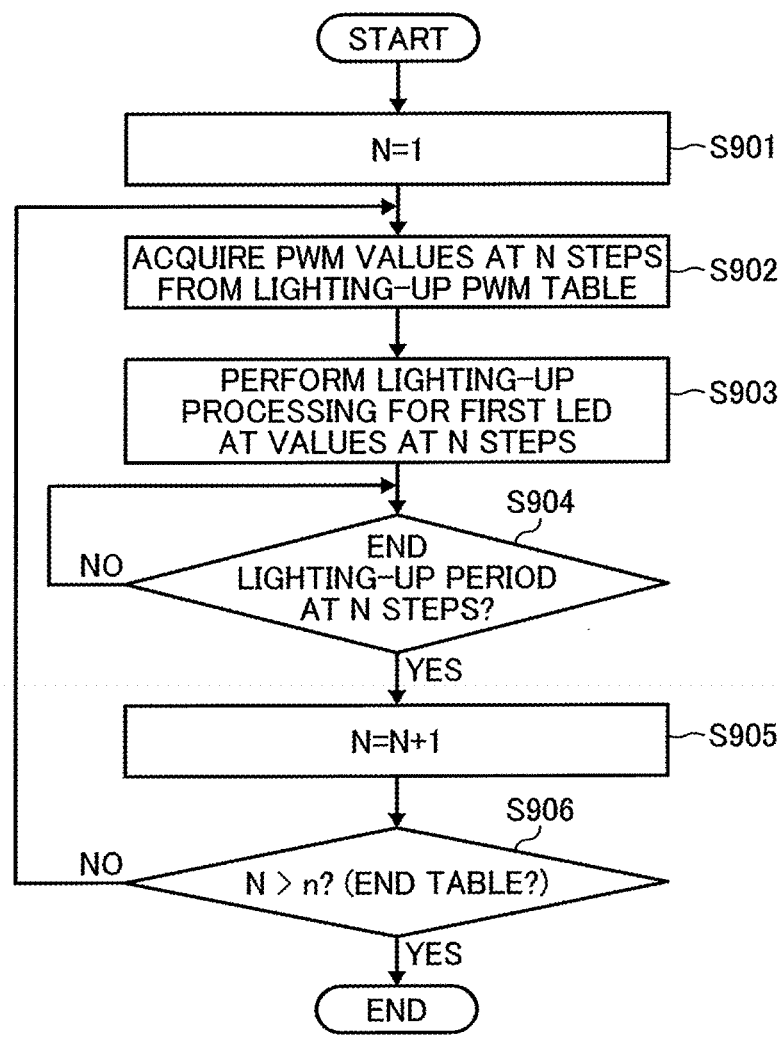
FIG. 37 is a flowchart illustrating details of step S801 of the operation of FIG. 36.

FIG. 37 is a flowchart illustrating details of S801. As illustrated in FIG. 37, the illumination controller 170 performs initial setting (N=1) (S901). The illumination controller 170 refers to the lighting-up PWM value table via the lighting-up controller 174, and reads out a PWM value on the lighting-up PWM value table to the lighting-up timing controller 172 per preset time n (S902). Based on PWM values given to the first LED 12-1, the illumination controller 170 executes lighting-up processing to gradually raise the duty ratio (PWM value) of the first LED 12-1 via the light source driver 171 by means of control of the lighting-up timing controller 172 (S903). When a lighting-up period based on the read PWM values ends ("YES" at S904), the illumination controller 170 increments the N value by 1 (N=N+1) (S905). In a case in which N does not reach the preset time (number of divided steps) n ("NO" at S906), the illumination controller 170 returns to S902. Conversely, in a case in which N reaches the preset time n ("YES" at S906), the illumination controller 170 determines that the lighting-up processing to gradually raise the duty ratio (PWM value) of the first LED 12-1 in the region A illustrated in FIG. 33 has ended.

Referring back to FIG. 36, when the lighting-up processing for the first LED 12-1 in the region A ends ("YES" at S802), the illumination controller 170 keeps a lighting-up state of the first LED 12-1 in an image acquisition period 1 (region B) to acquire an image irradiated by the first LED 12-1 (S803).

Subsequently, after the end of the image acquisition period 1 (region B) ("YES" at S804), the illumination controller 170 controls the lighting-up overlap unit 173 so that a lighting-up state of the first LED 12-1 and a lighting-up state of the second LED 12-2 may overlap with each other (S805).

Figure 38:
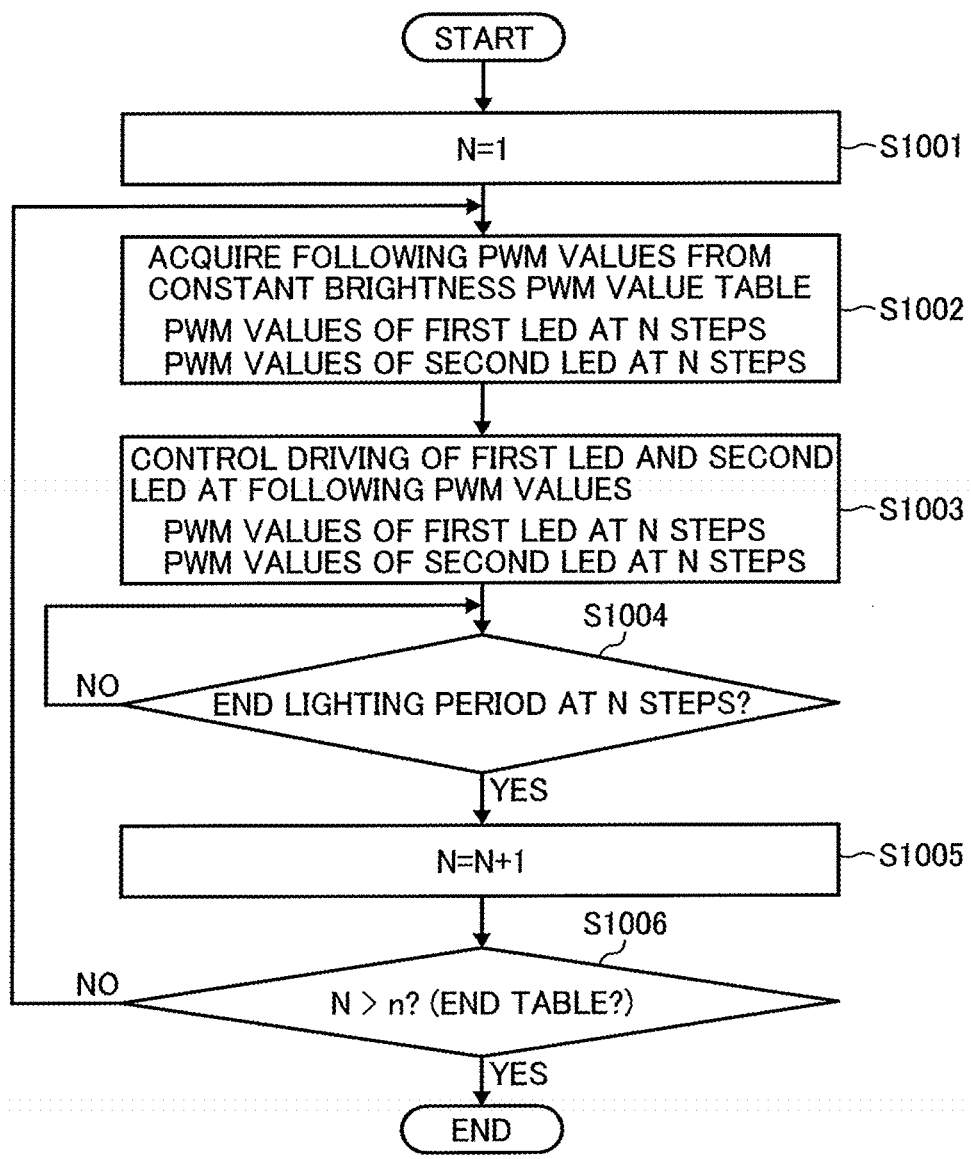
FIG. 38 is a flowchart illustrating details of step S805 of the operation of FIG. 36.

FIG. 38 is a flowchart illustrating details of step S805. As illustrated in FIG. 38, the illumination controller 170 performs initial setting (N=1) (S1001). The illumination controller 170 refers to the constant brightness PWM value table by means of the constant brightness controller 176, reads out a PWM value on the constant brightness PWM value table to the lighting-up timing controller 172 per preset time n (S1002). Based on PWM values given to the first LED 12-1 and the second LED 12-2, the illumination controller 170 executes lighting processing to gradually lower the duty ratio (PWM value) of the first LED 12-1 and lighting processing to gradually raise the duty ratio (PWM value) of the second LED 12-2 via the light source drivers 171 by means of control of the lighting-up timing controller 172 (S1003). When a lighting period based on the read PWM values ends ("YES" at S1004), the illumination controller 170 increments the N value by 1 (N=N+1) (S1005). In a case in which N does not reach the preset time n ("NO" at S1006), the illumination controller 170 returns to step S1002. Conversely, in a case in which N reaches the preset time n ("YES" at S1006), the illumination controller 170 determines that, in the overlap period (region C) illustrated in FIG. 33, the lighting processing, to keep constant (L1) brightness in the region B, brightness in the overlap period (region C), and brightness in the region D with use of the first LED 12-1 and the second LED 12-2, has ended.

Referring back to FIG. 36, when the lighting processing for the first LED 12-1 and the second LED 12-2 in the overlap period (region C) ends ("YES" at S806), the illumination controller 170 keeps a lighting-up state of the second LED 12-2 in an image acquisition period 2 (region D) to acquire an image irradiated by the second LED 12-2 (S807).

Subsequently, after the end of the image acquisition period 2 (region D) ("YES" at S808), the illumination controller 170 turns off the second LED 12-2 to gradually lower the duty ratio (PWM value) of the second LED 12-2 in a region E illustrated in FIG. 33 (S809).

Figure 39:
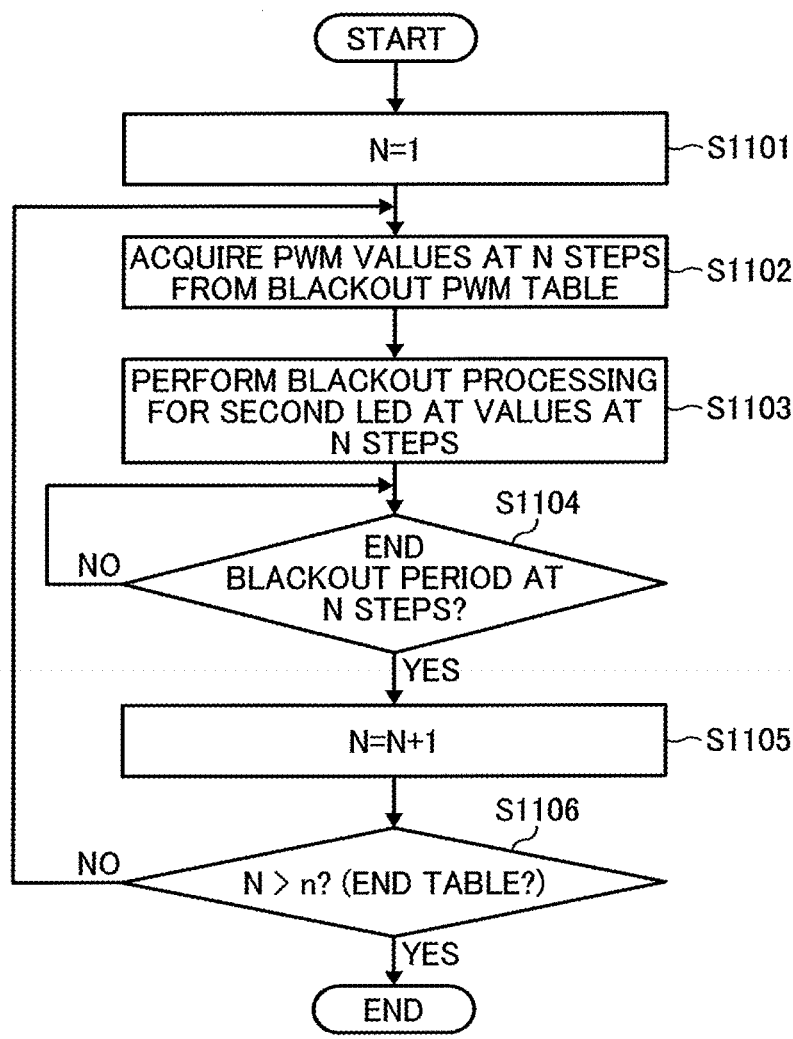
FIG. 39 is a flowchart illustrating details of step S809 of the operation of FIG. 36.

FIG. 39 is a flowchart illustrating details of step S809. As illustrated in FIG. 39, the illumination controller 170 performs initial setting (N=1) (S1101). The illumination controller 170 refers to the blackout PWM value table by means of the blackout controller 175, and reads out a PWM value on the blackout PWM value table to the lighting-up timing controller 172 per preset time n (S1102). Based on PWM values given to the second LED 12-2, the illumination controller 170 executes blackout processing to gradually lower the duty ratio (PWM value) of the second LED 12-2 via the light source driver 171 by means of control of the lighting-up timing controller 172 (S1103). When a blackout period based on the read PWM values ends ("YES" at S1104), the illumination controller 170 increments the N value by 1 (N=N+1) (S1105). In a case in which N does not reach the preset time (number of divided steps) n ("NO" at S1106), the illumination controller 170 returns to step S1102. Conversely, in a case in which N reaches the preset time n ("YES" at S1106), the illumination controller 170 determines that the blackout processing to gradually lower the duty ratio (PWM value) of the second LED 12-2 in the region E illustrated in FIG. 33 has ended.

Further, as illustrated in FIG. 33, the illumination controller 170 takes control so that a relationship between lighting-up time (T-up) of the lighting-up processing to gradually raise the duty ratio (PWM value) of the first LED 12-1 in the region A and blackout time (T-down) of the blackout processing to gradually lower the duty ratio (PWM value) of the second LED 12-2 in the region E may be as follows.

*T*-up>*T*-down

Since human eyes are more sensitive to flicker in brightening processing, the rise of the lighting-up of the first LED 12-1 in the region A is moderate. Conversely, the blackout of the second LED 12-2 in the region E does not require as much consideration of flicker as in the region A. To end the lighting control of the first LED 12-1 and the second LED 12-2 early, the blackout processing of the second LED 12-2 is performed in shorter time (T-down) than the lighting-up time (T-up) of the first LED 12-1 in the region A.

In this manner, by taking control so that the "blackout-to-lighting-up" time (T-up) of the first LED 12-1 may be longer than the "lighting-up-to-blackout" time (T-down) of the second LED 12-2, discomfort caused by too much brightness can be reduced, and time to acquire an image of each original can be shortened to prevent overexposure further than in a case of T-up=T-down.

The reason for enabling reduction of discomfort caused by too much brightness is as follows. As indices of adaptation to brightness, light adaptation (a state of adaptation to a bright condition) and dark adaptation (a state of adaptation to a dark condition) are provided. It is generally known that the dark adaptation takes much more time than the light adaptation. This indicates that human eyes are more sensitive to "a change from a dark state to a bright state" than to "a change from a bright state to a dark state." Accordingly, when lighting-up and blackout of the light sources are considered, "blackout to lighting-up" is detected more easily than "lighting-up to blackout."

In this manner, according to the present embodiment, in a case of switching a lighting state from one light source to the other light source, by taking control so that the lighting states of the two light sources may overlap with each other, the number of lighting-up/blackout patterns of the two light sources can appear to decrease in the eyes of the person around.

Also, according to the present embodiment, in a case of switching a lighting state from one light source to the other light source, the light sources are controlled so that the total brightness of the two light sources may not change. This prevents occurrence of flicker caused by lighting-up and blackout, thus preventing the user from feeling uncomfortable.

That is, in the section in which lighting-up is shifted from one light source to the other light source to acquire an image of each original to prevent overexposure, the operation in the section appears to be one-time lighting-up of one light source in the eyes of the person around, and a brightness fluctuation can be restricted. Accordingly, it is possible to restrict flicker caused by lighting-up and blackout from making the user feel uncomfortable.

Next, an eighth embodiment will be described. Note that similar components to the components in the above seventh embodiment are provided with the same reference numerals, and description of the same components is omitted.

In the seventh embodiment, the image reading apparatus 20 starts the lighting-up processing of the second LED 12-2 at the beginning of the overlap period (region C). However, the present embodiment differs from the seventh embodiment in that, at the time of image acquisition in which the first LED 12-1 emits light to a read target, in which the image capturing device 10 captures an image of the read target, and in which the read image is stored, pre-lighting-up processing of turning on the second LED 12-2 at a brightness level that does not generate overexposure or less is started.

Figure 40:
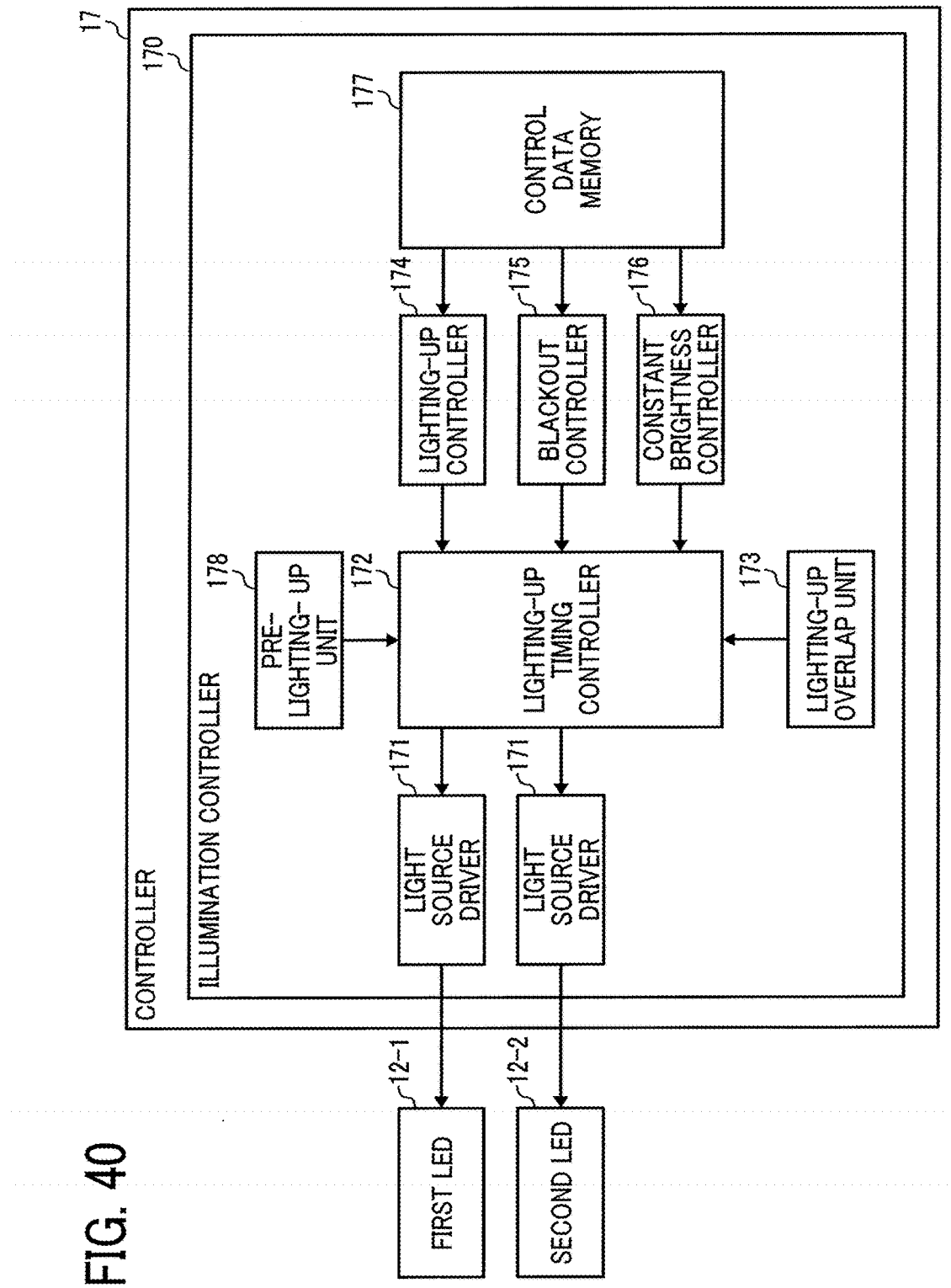
FIG. 40 is a functional block diagram illustrating functions performed by the controller of an image reading apparatus according to an eighth embodiment.
Figure 41:
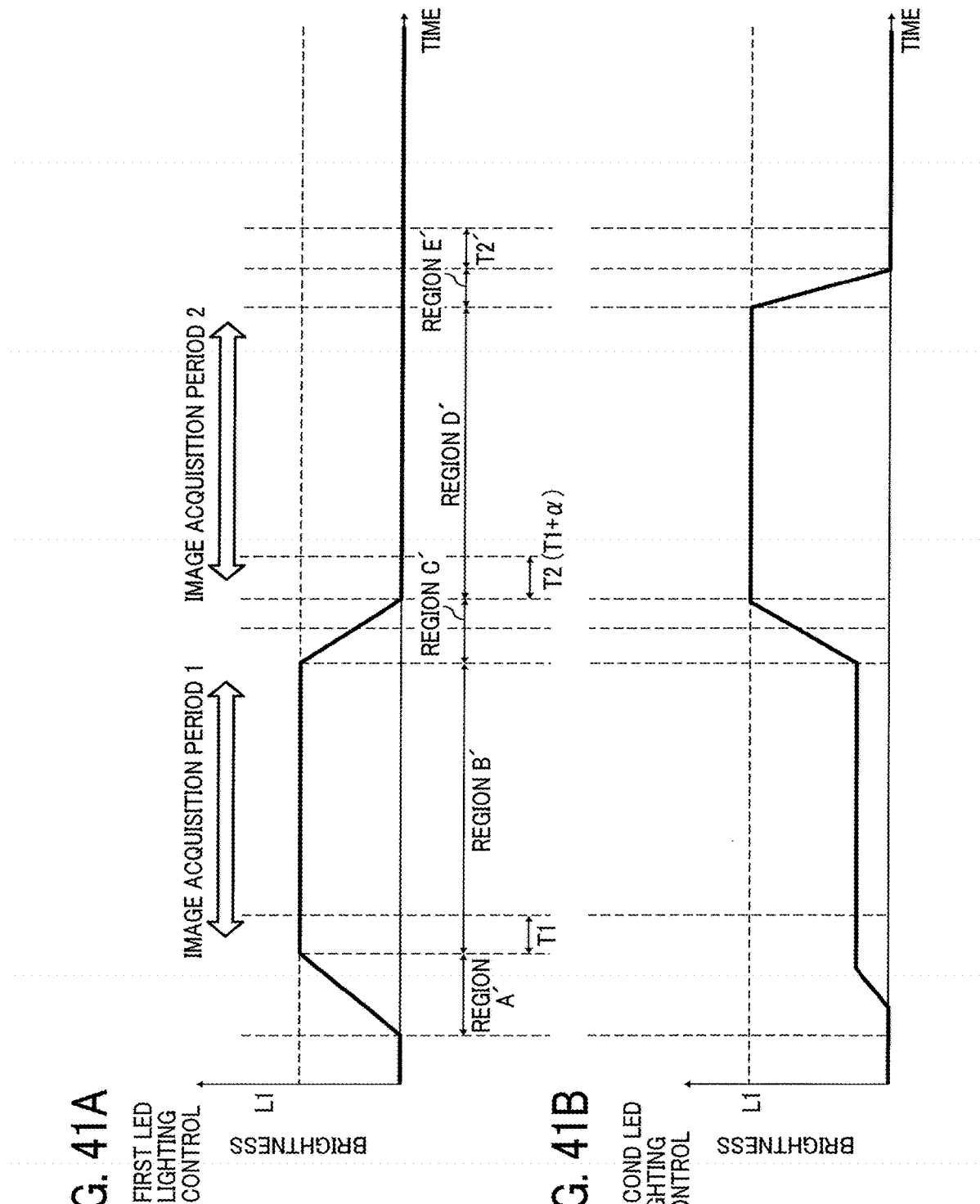
FIGS. 41A and 41B are an illustration of a lighting control example of the first LED and the second LED.
Figure 42:
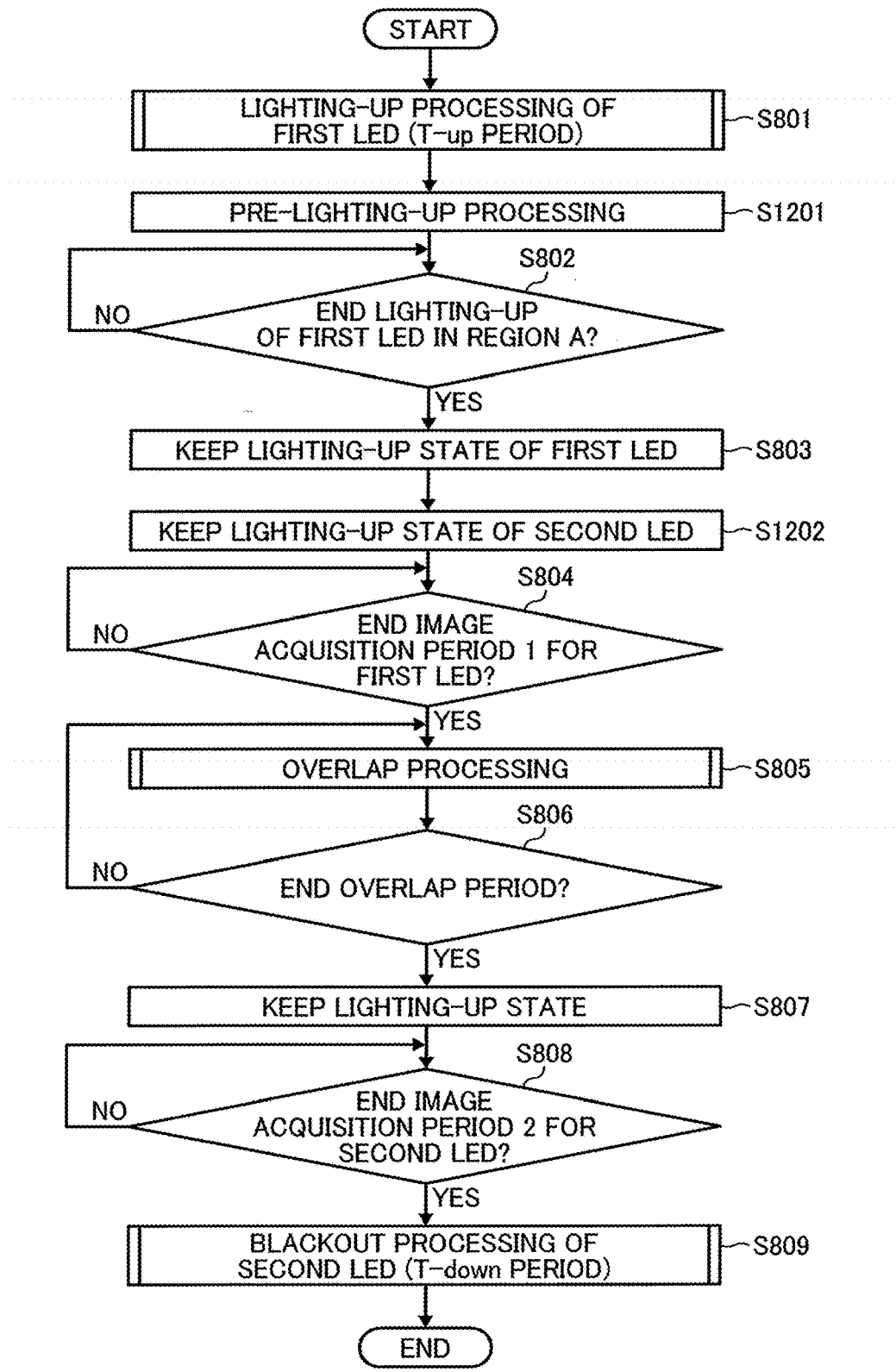
FIG. 42 is a flowchart illustrating operation of lighting control, according to an embodiment.

FIG. 40 is a functional block diagram illustrating functions performed by the controller 17 of the image reading apparatus 20 according to the eighth embodiment. As illustrated in FIG. 40, the illumination controller 170 of the controller 17 further includes a pre-lighting-up unit 178. The pre-lighting-up unit 178 starts pre-lighting-up processing of turning on the second LED 12-2 at a brightness level that does not generate overexposure or less at the time of image acquisition in which the first LED 12-1 emits light to a read target, in which the image capturing device 10 captures an image of the read target, and in which the read image is stored, FIGS. 41A and 14B illustrate a lighting control example of the first LED 12-1 and the second LED 12-2, and FIG. 42 is a flowchart illustrating lighting control processing. As illustrated in FIG. 42, the illumination controller 170 of the image reading apparatus 20 first turns on the first LED 12-1 to gradually raise the duty ratio (PWM value) of the first LED 12-1 in a region A' illustrated in FIG. 41 (S801).

The illumination controller 170 of the image reading apparatus 20 also performs the pre-lighting-up processing for the second LED 12-2 (S1201). In the pre-lighting-up processing, the illumination controller 170 is required to hold the brightness level of the second LED 12-2 to a brightness level that does not generate overexposure or less. Also, in the present embodiment, the illumination controller 170 takes control so that the lighting-up rise ratio of the second LED 12-2 may be equal to the lighting-up rise ratio of the second LED 12-2 illustrated in FIG. 33.

On the other hand, in the lighting-up processing in step S801, the illumination controller 170 turns on the first LED 12-1 at a brightness level derived by subtracting the brightness level executed in the pre-lighting-up processing for the second LED 12-2 from the target value (L1) as illustrated in FIG. 42. As a result, entire brightness on the document table 13 is kept constant (L1).

Due to this configuration, the region A' in the lighting control example illustrated in FIG. 41 is shorter than the region A in the lighting control example illustrated in FIG. 33 by "T1" time illustrated in FIG. 41, and the lighting control example illustrated in FIG. 41 is ready for image acquisition earlier.

When the lighting-up processing for the first LED 12-1 in the region A' ends ("YES" at S802), the illumination controller 170 keeps a lighting-up state of the first LED 12-1 in the image acquisition period 1 (region B') to acquire an image irradiated by the first LED 12-1 (S803).

The illumination controller 170 also keeps a lighting-up state of the second LED 12-2 in the image acquisition period 1 (region B') (S1202).

Subsequently, after the end of the image acquisition period 1 (region B') ("YES" at S804), the illumination controller 170 controls the lighting-up overlap unit 173 so that a lighting-up state of the first LED 12-1 and a lighting-up state of the second LED 12-2 may overlap with each other (S805).

Since the second LED 12-2 executes the pre-lighting-up processing, time to reach target brightness is shorter than time in the lighting control example illustrated in FIG. 33 by "α" (in a case in which FIG. 41 and FIG. 33 have an equal lighting-up rise ratio of the second LED 12-2). Accordingly, lighting control time in the lighting control example illustrated in FIG. 41 required until the target brightness level (L1) of the second LED 12-2 is reached can be shorter than lighting control time in the lighting control example illustrated in FIG. 33 by T2 (=T1+α).

When the lighting processing for the first LED 12-1 and the second LED 12-2 in the overlap period (region C') ends ("YES" at S806), the illumination controller 170 keeps a lighting-up state of the second LED 12-2 in the image acquisition period 2 (region D') to acquire an image irradiated by the second LED 12-2 (S807).

Finally, after the end of the image acquisition period 2 (region D') ("YES" at S808), the illumination controller 170 turns off the second LED 12-2 to gradually lower the duty ratio (PWM value) of the second LED 12-2 in a region E' illustrated in FIG. 41 (S809).

That is, after the target brightness level (L1) of the second LED 12-2 is reached, control of the second LED 12-2 is similar to control of the second LED 12-2 in the lighting control example illustrated in FIG. 33. The lighting control time in the lighting control example illustrated in FIG. 41 is shorter than the lighting control time in the lighting control example illustrated in FIG. 33 by T2' (=T2).

In this manner, according to the present embodiment, the lighting control time can be shortened.

Next, a ninth embodiment will be described. Note that similar components to the components in the above first embodiment to the above eighth embodiment are provided with the same reference numerals, and description of the same components is omitted.

The present embodiment describes an image forming apparatus 400 including the image reading apparatus 20.

Figure 43:
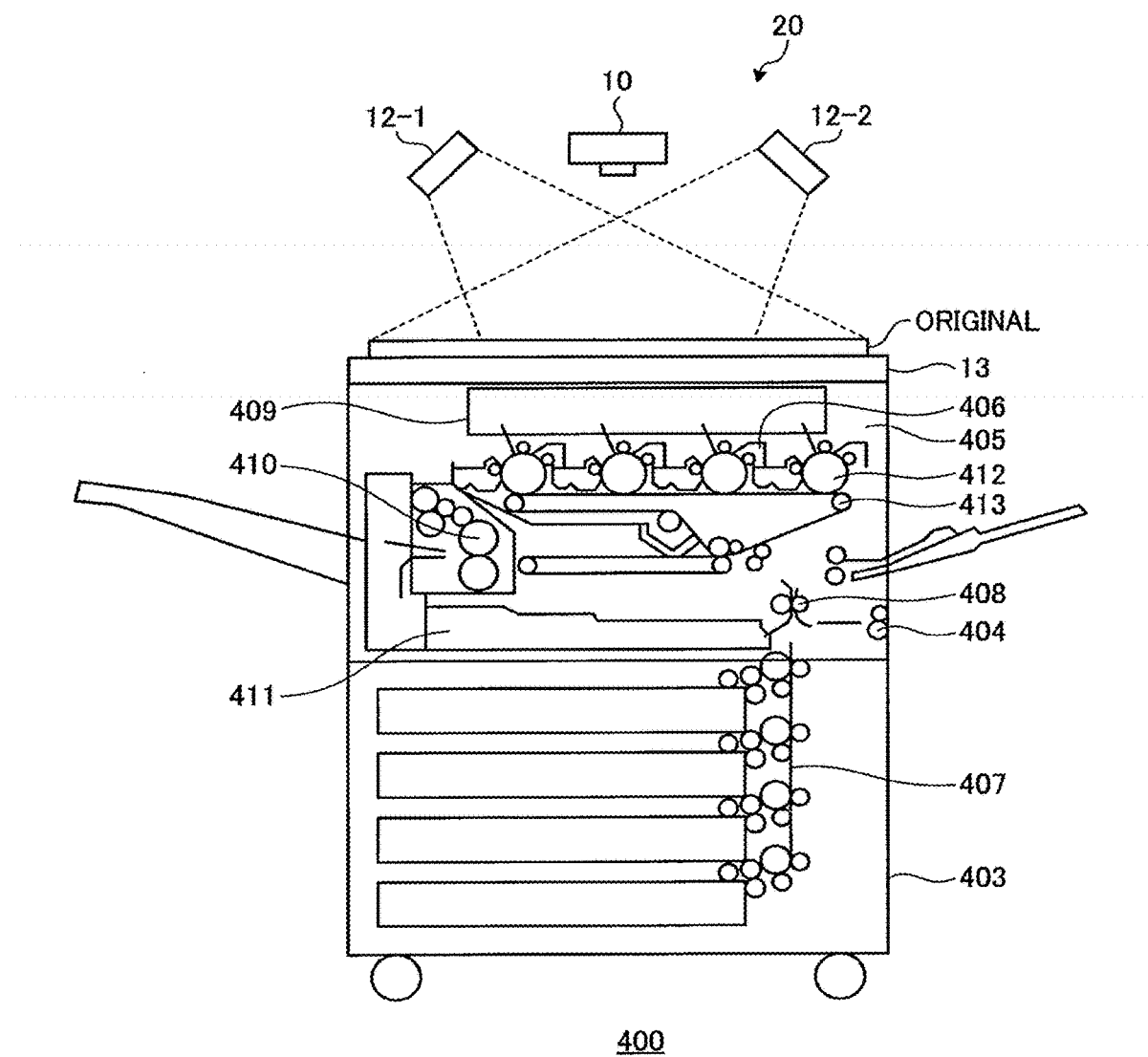
FIG. 43 illustrates an arrangement example of an image forming apparatus according to a ninth embodiment.

FIG. 43 illustrates an arrangement example of the image forming apparatus 400 according to the ninth embodiment. The image forming apparatus 400 is a digital copier including a sheet feeder 403 and an image forming apparatus main body 404 and provided at an upper portion with the image reading apparatus 20, for example.

The image forming apparatus main body 404 includes a tandem-system image formation unit 405, a registration roller 408 configured to convey a recording sheet supplied via a conveyance path 407 from the sheet feeder 403 to the image formation unit (image former) 405, an optical writing device 409, a fixing and conveying unit 410, and a tray for double-side printing 411.

In the image formation unit 405, four photoconductor drums 412 are arranged side by side to correspond to toners of four colors, Y, M, C, and K. Around each photoconductor drum 412, image formation elements such as a charging device, a developing device 406, a transfer device, a cleaner, and an anti-static device are arranged.

Also, between the transfer device and the photoconductor drums 412, an intermediate transfer belt 413 stretched over a driving roller and a driven roller is arranged in a state of being nipped by nips of the transfer device and the photoconductor drums 412.

For the respective colors of Y, M, C, and K, the tandem-system image forming apparatus 400 performs optical writing on the photoconductor drums 412 corresponding to the respective colors, performs developing for the toners of the respective colors in the developing device 406, and performs primary transfer on the intermediate transfer belt 413 in order of Y, M, C, and K, for example.

The image forming apparatus 400 then secondarily transfers on a recording sheet a full-color image on which the four colors have been superimposed by the primary transfer, fixes the image, and ejects the sheet to form the full-color image on the recording sheet. Also, the image forming apparatus 400 forms an image read by the image reading apparatus 20 on a recording sheet.

Since the image forming apparatus 400 includes the above-described image reading apparatus 20, the image forming apparatus 400 can output an image from which a specular light component has been eliminated at the time of image reading and does not make the user feel uncomfortable due to the flicker caused by the first LED 12-1 and the second LED 12-2.

Although the respective embodiments have been described above, specific arrangement, processing, data format, and the like of each component are not limited to what is described in the respective embodiments. Also, it is to be understood that the components in the aforementioned embodiments can arbitrarily be combined unless the components conflict with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A scanner, comprising:
   a plurality of light sources that separately emit light to a document set on a document table, the plurality of light sources being arranged at different irradiation positions above the document table;
   an illumination controller to sequentially and alternately turn on or off the plurality of light sources with a blinking cycle not perceptible to the human eye;
   an image capturing device arranged above the document table and configured to photoelectrically convert, pixel by pixel, reflected light of the light emitted to the document from the plurality of light sources, to capture a plurality of read images;
   a memory to store the plurality of read images; and
   a synthesizer to synthesize different regions of the plurality of read images using the read images stored in the memory to generate a synthesized read image representing the document, the different regions each being a region in which an influence of specular reflection light on image level is smaller than a threshold.

2. The scanner according to claim 1, further comprising:
   an electronic shutter to sequentially shield and expose the image capturing device from and to the emitted light, wherein, when one of the plurality of light sources emits light to the document, the illumination controller controls the electronic shutter to shield the image capturing device from reflected light of the light that has been emitted to the document by other of the plurality of light sources until the image capturing device outputs one of the read images corresponding to the reflected light of the light emitted by the one light source.

3. The scanner according to claim 1,
   wherein the image capturing device captures one of the read images as one of the plurality of light sources irradiates the document with the light and outputs the read images, which are obtained through a plurality of times of capturing, the image reading apparatus further comprising:
an adder to add the read images output by the image capturing device a number of times for each of the different irradiation positions, and
wherein the memory stores the read images added for each of the different irradiation positions.

4. The scanner according to claim 3,
wherein the illumination controller calculates a difference between average pixel values of the different regions in the read images captured by the image capturing device when the light sources irradiate the document with the light, and
when the calculated difference is equal to or higher than a predetermined threshold value, changes the number of times of addition performed by the adder in accordance with the calculated difference.

5. The scanner according to claim 1,
wherein the plurality of light sources includes two light sources that emit the light to the document from two different irradiation positions, and
when switching a lighting state from a first one of the light sources to a second one of the light sources, the illumination controller causes lighting states of the two light sources to overlap with each other.

6. The scanner according to claim 5, wherein the illumination controller includes:
two light source drivers to control brightness of the two light sources independently;
a lighting-up timing controller to determine a timing to turn on or timing to turn off the two light sources for the two light source drivers to synchronize lighting conditions of the two light sources with each other; and
a lighting-up overlap unit to instruct the lighting-up timing controller on an overlap period and overlap timing to cause lighting-up states of the two light sources to overlap with each other.

7. The scanner according to claim 6, wherein the illumination controller further comprises:
a lighting-up controller to control a first light source of the light sources to turn on such that the first light source becomes gradually brighter; and
a blackout controller to control a second light source of the light sources to turn off such that the second light source becomes gradually darker,
wherein the lighting-up overlap unit generates an overlap period in which lighting-up states of the first and second light sources overlap by operating the lighting-up controller and the blackout controller.

8. The scanner according to claim 7, wherein the illumination controller further includes comprises:
a constant brightness controller to control the blackout controller to turn off the first light source to cause the first light source to be gradually darker in the overlap period in which lighting-up states of the first and second light sources overlap, and control the lighting-up controller to turn on the second light source to cause the second light source to be gradually brighter in the overlap period, to keep constant brightness in the overlap period.

9. The scanner according to claim 7, wherein, when the first light source is first turned on, and the second light source is subsequently turned on, the illumination controller performs control so that a time during when the first light source is turned on to be gradually brighter, becomes longer than a time during when the second light source is turned off to be gradually darker.

10. The scanner according to claim 6, wherein the illumination controller further comprises:
a pre-lighting-up unit to start pre-lighting-up processing of turning on the second lighting source at a brightness level that does not generate overexposure or less, during a time when the image capturing device captures and stores the read image of the light by the first light source.

11. The scanner according to claim 1, wherein the illumination controller sets the blinking cycle to 10 ms or less.

12. The scanner according to claim 1,
wherein the illumination controller calculates a difference between average pixel values of the different regions in the read images captured by the image capturing device when the light sources irradiate the document with the light, and
when the calculated difference is equal to or higher than a predetermined threshold value, changes a light level of at least one of the plurality of light sources in accordance with the calculated difference.

13. The scanner according to claim 12,
wherein, when the light level of at least one of the plurality of light sources is changed, the illumination controller determines whether or not the difference between the average pixel values of the different regions in the read images is less than or equal to a predetermined value, the image reading apparatus further comprising:
a display to display a notification, when the illumination controller determines that the difference between the average pixel levels of the different regions in the read images is less than or equal to the predetermined value.

14. The scanner according to claim 1,
wherein the illumination controller calculates a difference between average pixel values of the different regions in the read images captured by the image capturing device when the light sources irradiate the document with the light, and
when the calculated difference is equal to or higher than a predetermined threshold value, changes an exposure time of the image capturing device in accordance with the calculated difference.

15. An image forming apparatus, comprising:
the scanner according to claim 1; and
an image forming device to form an image based on output of the image reading apparatus.

16. A scanning method, comprising:
controlling a plurality of light sources to separately emit light to a document set on a document table, the light sources being arranged at different irradiation positions above the document table, while causing the plurality of light sources to be sequentially and alternately turned on or off with a blinking cycle not perceptible to the human eye;
photoelectrically converting, pixel by pixel, reflected light of the light emitted to the document from the plurality of light sources to capture a plurality of read images;
storing, in a memory, the plurality of read images; and
synthesizing different regions of the plurality of read images using the read images stored in the memory, to generate a synthesized read image representing to the document, the different regions each being a region in which an influence of specular reflection light on image level is smaller than a threshold.

17. A non-transitory recording medium which, when executed by one or more processors, cause the processors to perform a scanning method comprising:
- controlling a plurality of light sources to separately emit light to a document set on a document table, the light sources being arranged at different irradiation positions above the document table, while causing the plurality of light sources to be sequentially and alternately turned on or off with a blinking cycle not perceptible to the human eye;
- photoelectrically converting, pixel by pixel, reflected light of the light emitted to the document from the plurality of light sources to capture a plurality of read images;
- storing, in a memory, the plurality of read images; and
- synthesizing different regions of the plurality of read images using the read images stored in the memory, to generate a synthesized read image representing the document, the different regions each being a region in which an influence of specular reflection light on image level is smaller than a threshold.

* * * * *